United States Patent
Imai et al.

(10) Patent No.: US 8,797,365 B2
(45) Date of Patent: Aug. 5, 2014

(54) IMAGE TRANSMISSION METHOD, DEVICE, AND COMPUTER-READABLE STORAGE MEDIUM STORING IMAGE TRANSMISSION PROGRAM

(75) Inventors: Tomoharu Imai, Kawasaki (JP); Kazuki Matsui, Kawasaki (JP); Kenichi Horio, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 247 days.

(21) Appl. No.: 13/287,186

(22) Filed: Nov. 2, 2011

(65) Prior Publication Data

US 2012/0139952 A1 Jun. 7, 2012

(30) Foreign Application Priority Data

Dec. 1, 2010 (JP) ................................ 2010-267996

(51) Int. Cl.
*G09G 5/00* (2006.01)

(52) U.S. Cl.
USPC ....................................................... 345/672

(58) Field of Classification Search
USPC ................................ 345/672–688
See application file for complete search history.

(56) References Cited

U.S. PATENT DOCUMENTS

| 7,685,257 | B2* | 3/2010 | King et al. | 709/219 |
| 8,456,380 | B2* | 6/2013 | Pagan | 345/2.2 |
| 2004/0217980 | A1* | 11/2004 | Radburn et al. | 345/672 |
| 2007/0132789 | A1* | 6/2007 | Ording et al. | 345/684 |
| 2009/0100373 | A1 | 4/2009 | Pixley et al. | |

FOREIGN PATENT DOCUMENTS

| JP | 5-241562 A | 9/1993 |
| JP | 7-280577 A | 10/1995 |
| JP | 2007-36339 A | 2/2007 |

OTHER PUBLICATIONS

Shen et al., A High-Performance Remote Computing Platform, IEEE Conference on Pervasive Computing and Communications, Mar. 2009.*

* cited by examiner

*Primary Examiner* — Xiao Wu
*Assistant Examiner* — Charles Tseng
(74) *Attorney, Agent, or Firm* — Fujitsu Patent Center

(57) ABSTRACT

An image transmission method includes using a computer processor, acquiring operation information at a transmission device from another device that instructs to scroll an image; determining a scroll direction and a scroll speed based on the operation information; generating a moving image from a plurality of images that are sequentially displayed on a screen of the other device at a display time interval when an image displayed on the screen of the other device is scrolled to the scroll direction at the speed for a time; and transmitting the moving image to the other device.

18 Claims, 27 Drawing Sheets

FIG. 24

| SENSOR CHARACTERISTICS CORRECTION COEFFICIENT TABLE | | | |
|---|---|---|---|
| TERMINAL ID | CORRECTION COEFFICIENT | | |
| | X | Y | Z |
| M00001 | 1.5 | 1.0 | 1.2 |
| M00002 | 1.0 | 0.8 | 0.5 |
| ... | ... | ... | ... |

| | | | 253 |
|---|---|---|---|
| VECTOR VALUE CONVERSION TABLE | | | |
| USER ID | ACCELERATION DETERMINATION CONDITION | SCROLL DIRECTION | VECTOR VALUE CALCULATION FORMULA |
| U00001 | $X' > 20$ | UP | $X' \times 100$ |
| | $X' < -20$ | DOWN | $X' \times 100$ |
| | $Y'/Z' > 6$<br>$Y' > 0$ | LEFT | $Y' \times 70$ |
| | $Y'/Z' < 3$<br>$Z' > 0$ | RIGHT | $Y' \times 30 + Z' \times 100$ |
| U00002 | $X'/Y' > 10$<br>$X'/Z' > 10$<br>$X' > 0$ | UP | $X' \times 100$ |
| | $X'/Y' > 10$<br>$X'/Z' > 10$<br>$X' < 0$ | DOWN | $X' \times 100$ |
| | $Y'/X' > 5$<br>$Y'/Z' > 5$ | LEFT | $Y' \times 50$ |
| | $Y'/X' > 5$<br>$Y'/Z' > 2$ | RIGHT | $Y' \times 30 + Z' \times 10$ |
| ... | ... | ... | ... |

IMAGE TRANSMISSION METHOD, DEVICE, AND COMPUTER-READABLE STORAGE MEDIUM STORING IMAGE TRANSMISSION PROGRAM

CROSS-REFERENCE TO RELATED APPLICATION

This application is based upon and claims the benefit of priority of the prior Japanese Patent Application No. 2010-267996, filed on Dec. 1, 2010, the entire contents of which are incorporated herein by reference.

FIELD

The embodiments discussed herein are related to an image transmission method, an image transmission device that transmits an image, and an image transmission program.

BACKGROUND

Conventionally, an information processing system to which a plurality of information processing apparatuses is coupled through a network has been used. The information processing system includes a system in which an information processing apparatus as a client device acquires data used for processing at the client device from an information processing apparatus as a server device and the client device requests processing to the server device.

As one of information processing systems, thin client systems have been used. In the thin client system, minimum functions are provided to a client device and a server device manages resources such as application programs and data. The client device displays processing results by the server device and data maintained by the server device on a display device. A user refers to content displayed on the display device and may operate application programs or data on the server device from the client device. In the thin client system, the client device may acquire image information from the server device. The above-described thin client system is disclosed, for example, in Japanese Laid-open Patent Publication No. 2007-36339, Japanese Laid-open Patent Publication No. 7-280577, and Japanese Laid-open Patent Publication No. 5-241562.

SUMMARY

In accordance with an aspect of the embodiments, an image transmission method includes using a computer processor, acquiring operation information at a transmission device from another device that instructs the transmission device to scroll an image; determining a scroll direction and a scroll speed based on the operation information; generating a moving image from a plurality of images that are sequentially displayed on a screen of the other device at a display time interval when an image displayed on the screen of the other device is scrolled to the scroll direction at the speed for a time; and transmitting the moving image to the other device.

The object and advantages of the invention will be realized and attained by at least the features, elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIG. 24 illustrates a data structure example of a sensor characteristics correction coefficient table;

FIG. 25 is a data structure example of a vector value conversion table;

DESCRIPTION OF EMBODIMENTS

Verifications by the inventors reveal additional drawbacks described hereunder. Resolution of a display device of a client device and resolution of a screen that a server device provides to the client device may sometimes differ. For example, when a mobile terminal device is used as a client device, a display device of the mobile terminal device is often small. Thus, displaying a full screen provided by the server device is sometimes difficult to be displayed on the display device.

To address the above-described issue, displaying a portion of the full screen on the display device of the client device and scrolling the display area may be considered. Retaining typically still image information that indicates a current display area (or including the peripheral part) by the client device is efficient in terms of memory usage. In this case, when a scroll operation for an area for which still image information is not retained is accepted, the client device acquires the still image information for the area from the server device and displays the area.

However, if frequency to update the screen is high (for example, a long distance is scrolled) in the above-described method, there is a drawback that changing the screen to follow the scroll operation may be delayed. For example, processing to receive and display still image information individually may frequently occur during scroll operations at the client device, and this may cause an operation response delay. Especially when a data amount of individual still image information increases, processing load for each still image information increases and the drawback becomes significant.

Figure 1:
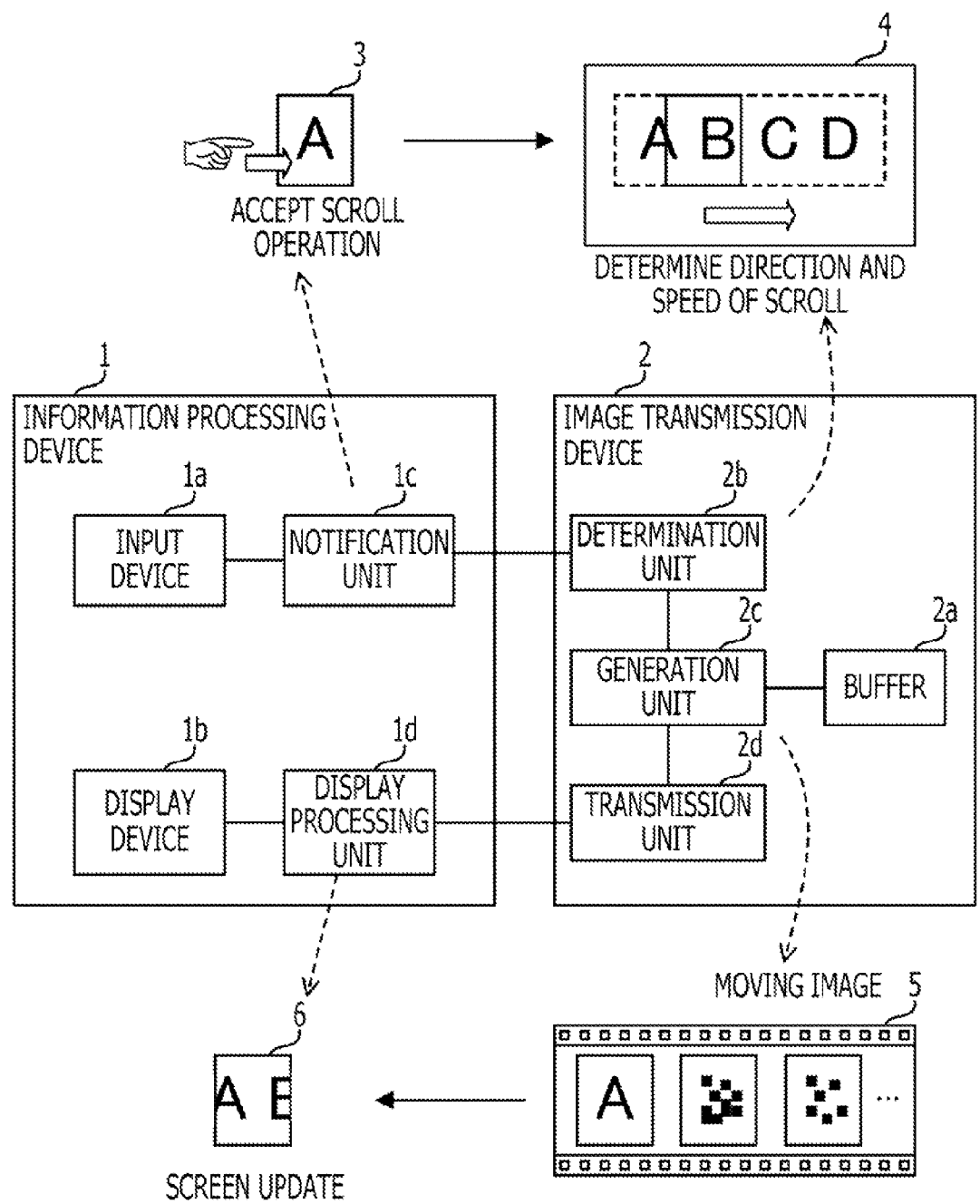
FIG. 1 illustrates an information processing system according to a first embodiment.

An embodiment will be described by referring to the accompanying drawings. FIG. 1 illustrates an information processing system according to a first embodiment. The information processing system includes an information processing device 1 and an image transmission device 2. The information processing device 1 corresponds to a client device while the image transmission device 2 corresponds to a server device in an example of a thin client system.

The information processing device 1 displays an image provided by the image transmission device 2 and displays the image to a user. The information processing device 1 includes an input device 1a, a display device 1b, a notification unit 1c and a display processing unit 1d.

The input device 1a accepts an operation input by the user. The input device 1a is, for example, a touch panel, a keypad, or various sensors (for example, an acceleration sensor).

The display device 1b displays an image 3 provided by the image transmission device 2 on a display provided to the display device 1b.

The notification unit 1c acquires operation information according to an operation input for the input device 1a and transmits the acquired information to the image transmission device 2. The display processing unit 1d updates the image 3 displayed on the display device 1b based on the screen information received from the image transmission device 2 and causes the display device 1b to display an image 6.

The image transmission device 2 generates a moving image 5 for updating an image displayed on the display device 1b based on the operation information received from the information processing apparatus 1 and transmits the moving image 5 to the information processing apparatus 1. The image transmission device 2 includes a buffer 2a, a determination unit 2b, a generation unit 2c, and a transmission unit 2d.

The buffer 2a is a storage device to store image data 4 that includes an image to be displayed by the information processing device 1. When the determination unit 2b acquires operation information from the information processing apparatus 1 that instructs to scroll an image 3, the determination unit 2b determines a scroll direction and a scroll speed based on the operation information.

The generation unit 2c generates the moving image 5 from a plurality of images sequentially displayed on a screen of the display device 1b at a display time interval when an image displayed on the display device 1b of the information processing apparatus 1 is scrolled to the scroll direction with the speed for a specified time. The generation unit 2c may acquire the plurality of images by referring to the image data 4 stored in the buffer 2a.

The transmission unit 2d transmits the moving image 5 generated by the generation unit 2c to the information processing apparatus 1. According to the image transmission device 2, when the determination unit 2b acquires operation information from the information processing apparatus 1 that instructs to scroll the image 3, the determination unit 2b determines a scroll direction and a scroll speed based on the operation information. The generation unit 2c generates the moving image 5 from the plurality of images sequentially displayed on the screen of the information processing apparatus 1 at the display time interval when the image displayed on the information processing apparatus 1 is scrolled to the scroll direction at the scroll speed for the specified time. The transmission unit 2d transmits the moving image 5 to the information processing apparatus 1.

Accordingly, a delay in transmitting a scroll image may be suppressed. For example, the determination unit 2b generates a scroll image with a moving image format. When screen information for an update is transmitted by a still image format as in a conventional method, reception and display processing is repeatedly performed for each piece of screen information at the information processing apparatus 1. Especially when a screen is updated frequently, processing the screen information of the still image format individually causes a delay in updating screen due to substantial increase of an overhead to process each piece of data.

Generating and transmitting the moving image 5 as described above may reduce a processing burden on the information processing apparatus 1 compared with when a scroll image is transmitted by a still image format. As a result, a screen interface that improves a response speed for a user operation may be achieved.

The generation unit 2c may generate the moving image 5 for updating an entire image displayed on the display device 1b, or may generate the moving image 5 for typically an update area when the update area is limited. Generating a moving image 5 typically for the update area and transmitting the moving image 5 to the information processing apparatus 1 further reduces processing burden on the information processing apparatus 1. Thus, the response speed may further be improved.

Figure 2:
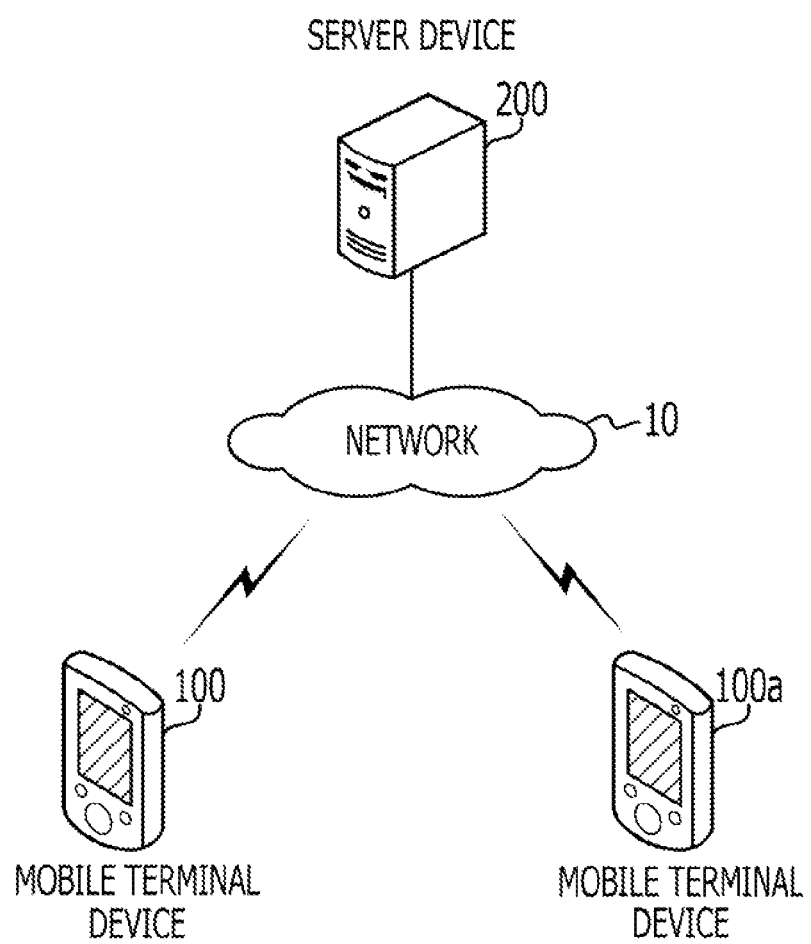
FIG. 2 illustrates a thin client system according to a second embodiment.

According to a second embodiment and a third embodiment described hereunder, a case in which an image transmission device 2 is applied to a thin client system is described. FIG. 2 illustrates a thin client system according to the second embodiment. The thin client system includes a mobile terminal device 100, a mobile terminal device 100a, and a server device 200.

The mobile terminal device 100 and the mobile terminal device 100a provide a Graphical User Interface (GUI) to a user based on screen information provided by the server device 200. The mobile terminal device 100 and the mobile terminal device 100a include substantially minimum functions desired to display the GUI. For example, the mobile terminal device 100 and a mobile terminal device 100a store an Operating System (OS) program for an Embedded System and application programs to display images and to transmit operation information.

The server device 200 provides an OS screen (for example, a desktop screen) for each user executed by the server device 200 to the mobile terminal device 100 and the mobile terminal device 100a. The server device 200 controls execution of the OS program for each user. Each OS program is executed, for example, by hardware assigned to each user by the server device 200. For example, the server device 200 has a blade configuration and hardware on a blade may be assigned to each user. Alternatively, the server device 200 may assign hardware provided in another server device (not illustrated) that is coupled to a network 10 to each user.

Communication between the server device 200 and the mobile terminal device 100 or the mobile terminal device 100a may be achieved, for example, by Remote FrameBuffer (registered trademark, RFB®) protocol. When a large amount of data is transmitted between the server device 200 and the mobile terminal device 100 or the mobile terminal device 100a by the generally used protocol, a delay may be caused in a screen display at the mobile terminal device 100 or the mobile terminal device 100a. Especially when operations that cause screen update frequently in a short time period at the mobile terminal device 100 or the mobile terminal device 100a, delays may be increased.

Hereinafter, a thin client system in which the above-described delay is suppressed will be described. A scroll operation that instructs to scroll a screen is assumed as a user operation to instruct to update the screen. Moreover, resolution of a display provided to the mobile terminal device 100 or the mobile terminal device 100a is smaller compared with resolution of an entire OS screen provided by the server device 200. Hence, it is assumed that displays provided in the mobile terminal device 100 and the mobile terminal device 100a may not display the entire OS screen at substantially the same magnification at once.

Figure 3:
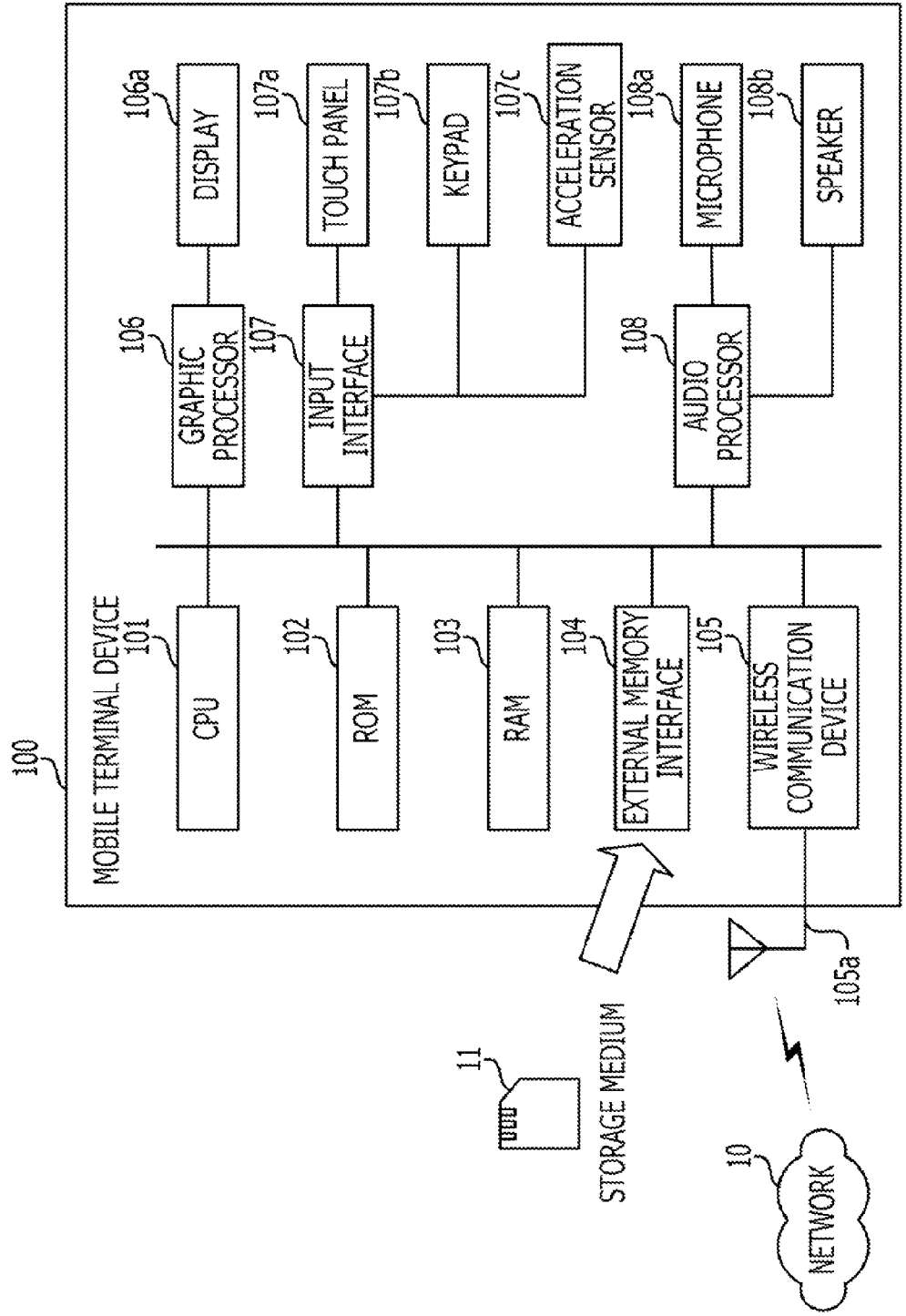
FIG. 3 illustrates a hardware configuration of a mobile terminal device according to the second embodiment.

Furthermore, mainly the mobile terminal device 100 will be described below. The terminal device 100a may be achieved by substantially the same configuration as that of the terminal device 100. FIG. 3 illustrates a hardware configuration of a mobile terminal device according to the second embodiment. The mobile terminal device 100 includes a Central Processing Unit (CPU) 101, a Read Only Memory (ROM) 102, a Random Access Memory 103, an external memory interface 104, a wireless communication device 105, a graphic processor 106, a display 106a, an input interface 107, a touch panel 107a, a keypad 107b, an acceleration sensor 107c, an audio processor 108, a microphone 108a, and a speaker 108b.

The CPU 101 executes an OS program and an application program to control operations of the entire mobile terminal 100. The ROM 102 stores a program such as a Basic Input/Output System (BIOS) program executed when the mobile terminal device 100 is executed. The ROM 102 may be a rewritable non-volatile memory.

The RAM 103 temporarily stores a part of the OS program and application programs executed by the CPU 101. The RAM 103 temporarily stores a part of the data used for processing by the CPU 101.

The external memory interface 104 reads data stored in a storage medium 11 and stores data in the storage medium 11. The storage medium 11 stores programs executed, for example, by the mobile terminal device 100. The mobile terminal device 100 may achieve a control function, which will be described later, for example, by executing programs stored in the storage medium 11. In other words, a program in which a processing content of the control function is written may be distributed by storing the program in the storage medium 11. The program may be stored in the ROM 102 beforehand.

The storage medium 11 may be, for example, a magnetic recording device, an optical disk, a magneto-optical recording medium, and a semiconductor memory. The magnetic recording device includes a hard disk drive (HDD), a flexible disk (FD), and a magnetic tape. The optical disk includes a Compact Disc (CD), a CD-Recordable (R)/ReWritable (RW), a Digital Versatile Disc (DVD), and DVD-R/RW/RAM. The magneto-optical recording medium includes a Magneto-Optical disk (MO). However, the computer-readable medium does not include a transitory medium such as a propagation signal. The semiconductor memory includes a flash memory such as a Universal Serial Bus (USB).

The wireless communication device 105 performs wireless signal processing and achieves wireless communication through the network 10. For example, the wireless communication device 105 demodulates and decodes signals received through an antenna 105a and outputs obtained reception data to the CPU 101. The wireless communication device 105 encodes and modulates transmission data acquired from the CPU 101 and transmits the obtained transmission signals to the network 10 through the antenna 105a.

Programs may be stored in the server device 200 and another server device (not illustrated) coupled to the network 10. In this case, the mobile terminal device 100 may download a program from the server device 200 and the other server device and execute the program.

The graphic processor 106 performs image display processing. For example, the graphic processor 106 acquires image data from the CPU 101 and causes the display 106a to display the image data. The display 106a is, for example, a Liquid Crystal Display (LCD) or an Electro Luminescence display.

The input interface 107 performs processing for an input operation by a user. For example, when the input interface 107 detects a touch operation for the touch panel 107a or a key press for the keypad 107b, the input interface 107 outputs an input signal indicating a pressed touch position or a key to the CPU 101. The input interface 107 acquires acceleration of triaxial direction of the mobile terminal device 100 detected by the acceleration sensor 107c and outputs the acquired acceleration to the CPU 101.

The touch panel 107a is positioned at an upper layer of the display 106a. A user of the mobile terminal device 100 may view an image displayed on the display 106a through the touch panel 107a. The user may perform a touch operation for the touch panel 107a while viewing an image displayed on the display 106a.

The audio processor 108 performs audio signal processing. For example, the audio processor 108 acquires an audio analog signal from the microphone 108a, performs signal conversion processing as required, and makes the speaker 108b reproduce the audio.

Figure 4:
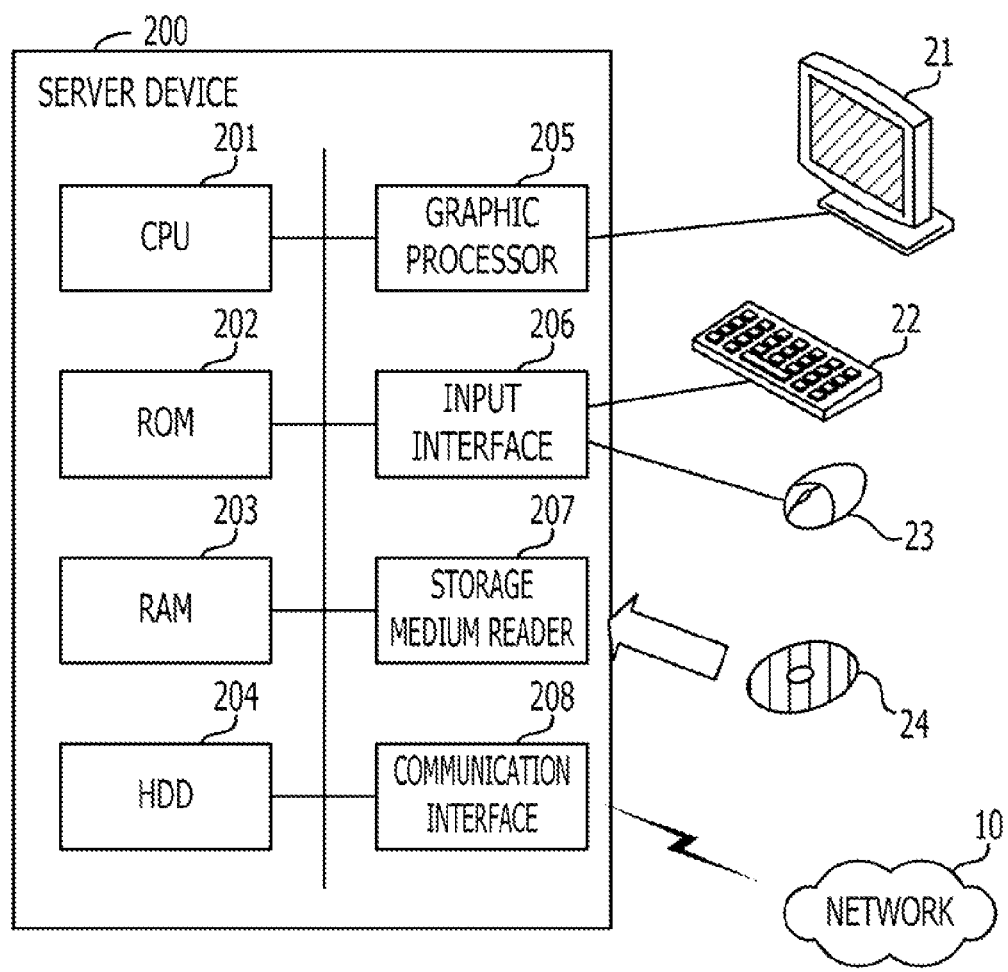
FIG. 4 illustrates a hardware configuration of a server device according to the second embodiment.

The mobile terminal device 100a may be achieved by substantially the same configuration as the mobile terminal device 100. FIG. 4 illustrates a hardware configuration of a server device according to the second embodiment. The server device 200 includes a CPU 201, a ROM 202, a RAM 203, a Hard Disk Drive (HDD) 204, a graphic processor 205, an input interface 206, a storage medium reader 207, and a communication interface 208.

The CPU 201 executes an OS program and an application program to control the entire server device 200. The ROM 202 stores a program such as a Basic Input/Output System (BIOS) program executed when the server device 200 is started. The ROM 202 may be a rewritable non-volatile memory.

The RAM 203 temporarily stores at least a part of the OS program and application programs executed by the CPU 201. The RAM 203 temporarily stores at least a part of the data used for processing by the CPU 201.

The HDD 204 stores the OS program and the application programs. Moreover, the HDD 204 stores data used for processing by the CPU 201. Other types of non-volatile storage devices such as a Solid State Drive (SSD) may be used instead of the HDD 204 (or together with the HDD 204).

The graphic processor 205 is coupled to a monitor 21. The graphic processor 205 causes the monitor 21 to display an image according to an instruction from the CPU 201. The input interface 206 is coupled to an input device such as a keyboard 22 or a mouse 23. The input interface 206 outputs an input signal transmitted from the input device to the CPU 201.

The storage medium reader 207 reads data stored in a storage medium 24. The storage medium 24 stores an image transmission program that is executed by the server device 200. The server device 200 may achieve an image transmission function, which will be described later, by executing, for example, the image transmission program stored in the storage medium 24. In other words, the image transmission program may be distributed by storing in the computer-readable storage medium 24.

As in the storage medium 11, various types of storage media may be used as the storage medium 24. The image transmission program may be stored in another server device (not illustrated) that is coupled to the network 10. In this case, the server device 200 may download the image transmission program from the other server device and execute the program.

The communication interface 208 is coupled to the network 10. The communication interface 208 may perform data communication with the mobile terminal device 100 and the mobile terminal device 100a through the network 10.

Figure 5:
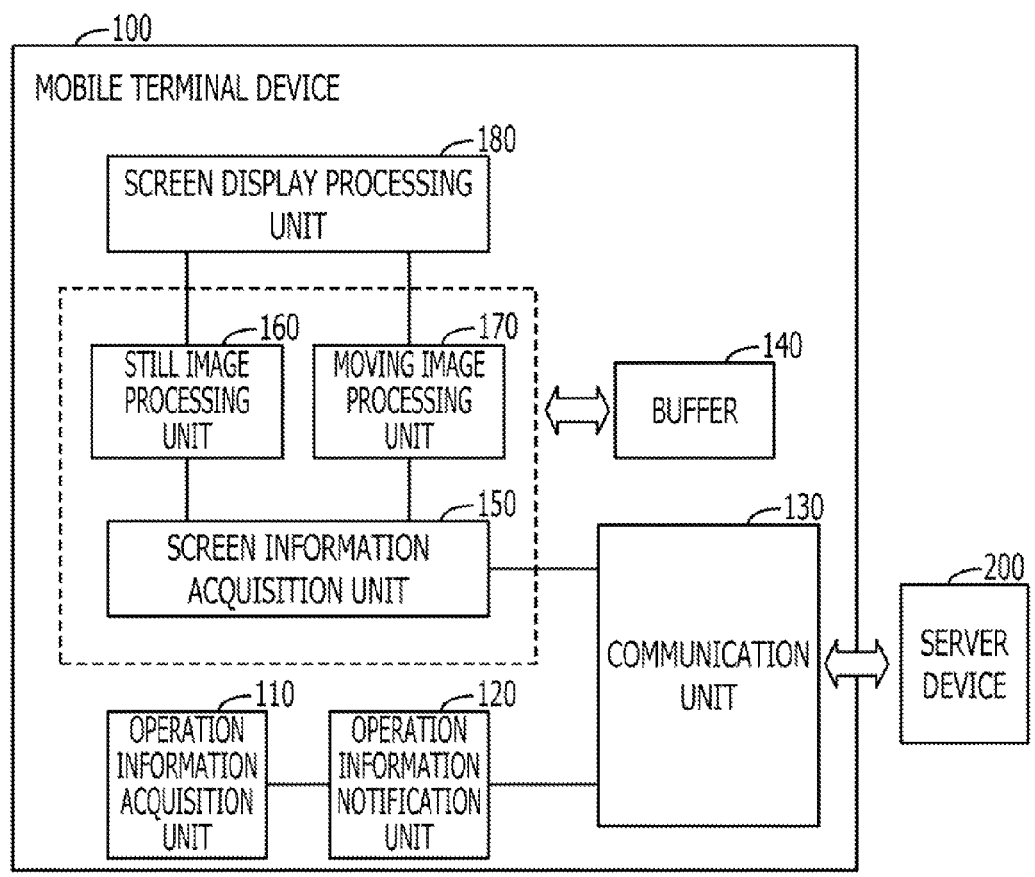
FIG. 5 is a block diagram illustrating functions of the mobile terminal device according to the second embodiment.

FIG. 5 is a block diagram illustrating functions of the mobile terminal device according to the second embodiment. The mobile terminal device 100 includes an operation information acquisition unit 110, an operation information notification unit 120, a communication unit 130, a buffer 140, a screen information acquisition unit 150, a still image processing unit 160, a moving image processing unit 170, and a screen display processing unit 180. Functions of these units are achieved on the mobile terminal device 100 by executing a program by the CPU 101. Note that all or part of the functions of these units may be implemented by dedicated hardware.

The operation information acquisition unit 110 detects a touch operation for the touch panel 107a or a key press for the keypad 107b. The operation information acquisition unit 110 acquires operation information according to the operation inputs.

The operation information includes information indicating a time when an operation input is performed (for example, year, month, date, hour, minute, and second) and a position of the operation (for example, a coordinate indicating a position on the OS screen). The coordinate that indicates a position on the OS screen indicates a position on the OS screen executed on the server device 200. The operation information acquisition unit 110 converts a detected position on the display 106a into the coordinate. In order to perform the conversion, for example, the operation information acquisition unit 110 maintains a correspondence relationship between an original point on the display 106a and a coordinate on the OS screen. Moreover, the operation information includes information that indicates an area of the screen currently displayed on the display 106a (hereinafter, referred to as display area information). The display area information includes information indicating a width and a height of a screen currently displayed on the display 106a in addition to the coordinate that indicates the position on the screen.

Moreover, the operation information may include information to identify the mobile terminal device 100 and the mobile terminal device 100a. The operation information acquisition unit 110 outputs the acquired operation information to the operation information notification unit 120.

The operation information notification unit 120 notifies the server device 200 of the operation information acquired from the operation information acquisition unit 110 through the communication unit 130. The communication unit 130 performs data communication to and from the server device 200. The communication unit 130 transmits the operation information acquired from the operation information notification unit 120 to the server device 200. When the communication unit 130 receives screen information that indicates an update content of a screen to be displayed on the display 106a (hereinafter, referred to as difference information) from the server device 200, the communication unit 130 outputs the difference information to the screen information acquisition unit 150.

The buffer 140 stores information of a currently displayed screen and difference information that indicates an update content of the screen information. The screen information acquisition unit 150 stores the difference information acquired from the communication unit 130 in the buffer 140. The screen information acquisition unit 150 instructs the still image processing unit 160 to process the difference information when the difference information is a still image format. Meanwhile, the screen information acquisition unit 150 instructs the moving image processing unit 170 to process the difference information when the difference information is a moving image format.

The still image processing unit 160 generates image data from difference information with the still image format stored in the buffer 140 according to an instruction from the screen information acquisition unit 150 and outputs the image data to the screen display processing unit 180.

The moving image processing unit 170 outputs image data obtained by decoding difference information with the moving image format stored in the buffer 140 according to an instruction from the screen information acquisition unit 150 and outputs the image data to the screen display processing unit 180.

The screen display processing unit 180 generates an image signal corresponding to the image data based on the image data acquired from the still image processing unit 160 or the moving image processing unit 170 and causes the display 106a to display the image on the screen.

Figure 6:
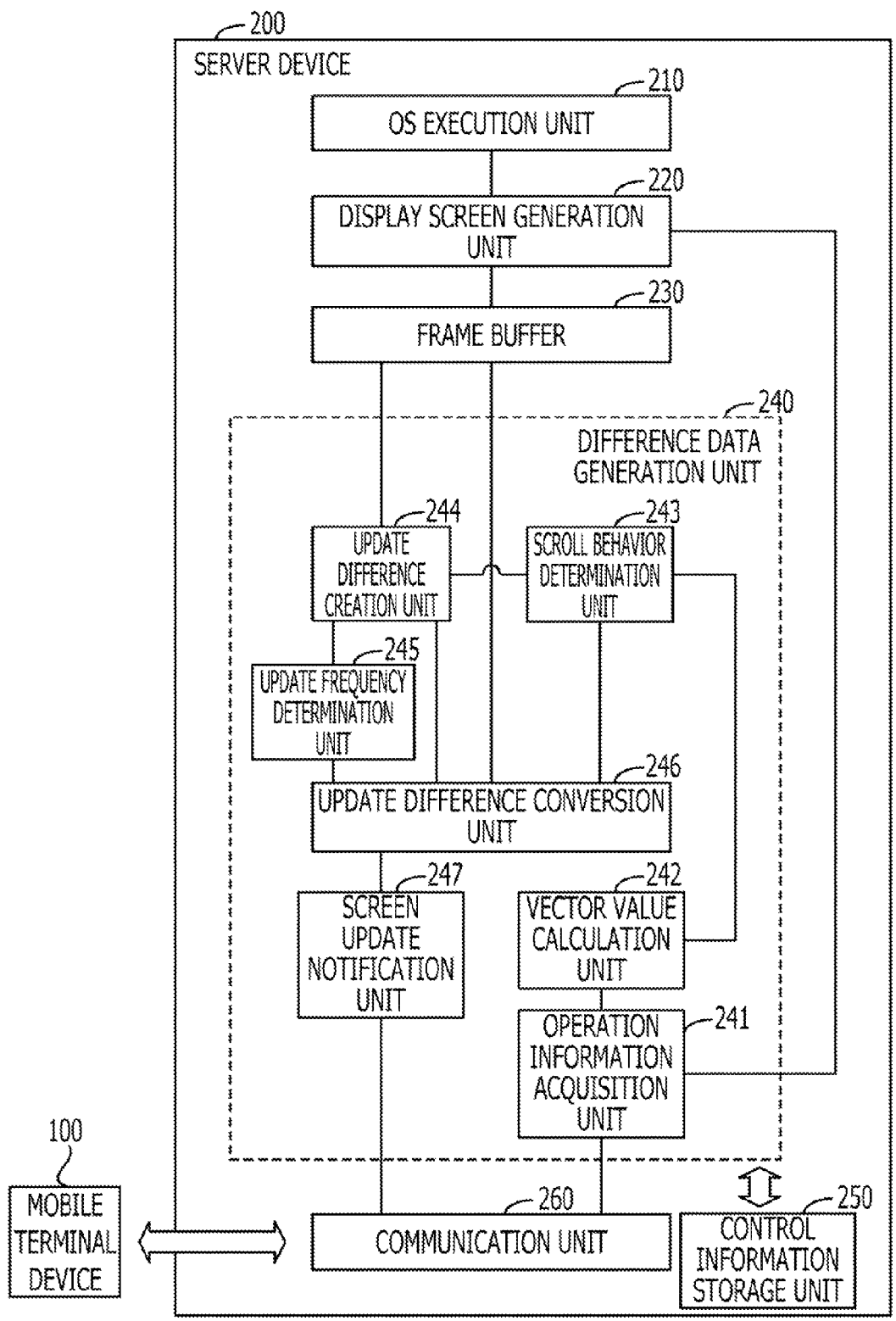
FIG. 6 is a block diagram illustrating functions of the server device according to the second embodiment.

FIG. 6 is a block diagram illustrating functions of the server device according to the second embodiment. The server device 200 includes an OS execution unit 210, a display screen generation unit 220, a frame buffer 230, a difference data generation unit 240, a control information storage unit 250, and a communication unit 260. Functions of the units are achieved on the server device 200 by executing an image transmission program by the CPU 201. Note that all or part of the functions of these units may be implemented by dedicated hardware.

The OS execution unit 210 executes an OS of the mobile terminal device 100 and the mobile terminal device 100a for each user. The display screen generation unit 220 generates screen information of an OS executed by the OS execution unit 210 (OS screen information) and stores the screen information in the frame buffer 230.

The frame buffer 230 stores the OS screen information generated by the display screen generation unit 220. The difference data generation unit 240 generates difference data of the OS screen information to be subsequently transmitted to the mobile terminal device 100 and the mobile terminal device 100a based on the operation information acquired from the mobile terminal device 100 and the mobile terminal device 100a. The difference data generation unit 240 includes an operation information acquisition unit 241, a vector value calculation unit 242, a scroll behavior determination unit 243, an update difference creation unit 244, an update frequency determination unit 245, an update difference conversion unit 246, and a screen update notification unit 247.

The operation information acquisition unit 241 acquires operation information from the mobile terminal device 100 and the mobile terminal device 100a through the communication unit 260. The operation information acquisition unit 241 stores the acquired operation information in the control information storage unit 250.

The vector value calculation unit 242 calculates information relating to a vector that indicates a scroll operation (hereinafter, referred to as vector information) based on operation information stored in the control information storage unit 250. The vector information includes information indicating, for example, a size and a direction of the vector. The size of the vector indicates a speed of the scroll. The direction of the vector indicates a direction of the scroll.

The scroll behavior determination unit 243 determines whether an input operation corresponding to the operation information is a scroll operation based on the vector information calculated by the vector value calculation unit 242 and the operation information stored in the control information storage unit 250. When the operation input corresponds to the operation information is a scroll operation, the scroll behavior determination unit 243 estimates a scroll area based on the vector information. The scroll area is a trajectory of an area on the OS screen that may be displayed on the mobile terminal device 100 during the scroll.

The scroll behavior determination unit 243 determines a scroll direction, a frame size, a frame rate, and so on based on the vector information. Here, the scroll direction is information indicating, for example, a direction among top, bottom, right and left to which a screen displayed on the display 106a is scrolled. The frame size is a data amount per frame. The frame rate is the number of frames per unit time.

Information indicating a scroll area, a scroll direction, a frame size, and a frame rate and so on that indicate a scroll area determined by the scroll behavior determination unit 243 are collectively referred to as scroll behavior. The scroll behavior determination unit 243 outputs the determined scroll behavior to the update difference creation unit 244.

The update difference creation unit 244 sequentially extracts update frames corresponding to the scroll area (hereinafter, referred to as a predicted update frame) from the frame buffer 230 based on the scroll behavior acquired from the scroll behavior determination unit 243. The update difference creation unit 244 extracts a predicted update frame, for example, with a size substantially the same as the screen size of the display 106a. The update difference creation unit 244 acquires information of update difference between the extracted predicted update frames (information that indicates an update area (pixels)) and sequentially outputs the information to the update frequency determination unit 245.

The update frequency determination unit 245 estimates an update frequency based on update difference information sequentially acquired from the update difference creation unit 244. The update frequency determination unit 245 determines that the update frequency is high when the update frequency is higher than a specified threshold. The update frequency determination unit 245 instructs the update difference conversion unit 246 to generate an update frame corresponding to the scroll area with a moving image format.

The update frequency determination unit 245 determines that an update frequency is low when an update frequency between frames is smaller than the specified threshold. The update frequency determination unit 245 instructs the update difference conversion unit 246 to generate an update frame with a still image format.

When the update difference conversion unit 246 receives an instruction from the update frequency determination unit 245 to generate an update frame with a moving image format, the update difference conversion unit 246 acquires scroll behavior and display area information from the scroll behavior determination unit 243. The update difference conversion unit 246 extracts an update frame with a size corresponding to the size of the screen area of the display 106a from the frame buffer 230 and converts the extracted update frame into a moving image (encode). The update difference conversion unit 246 outputs the difference information generated with the moving image format to the screen update notification unit 247.

When the update difference conversion unit 246 receives an instruction to generate the update frame with the still image format, the update difference conversion unit 246 acquires the scroll behavior and the display area information from the scroll behavior determination unit 243. The update difference conversion unit 246 extracts an update frame with a size corresponding to the size of the screen area of the display 106a from the frame buffer 230 and outputs the difference information generated with the still image format to the screen update notification unit 247.

The screen update notification unit 247 transmits the difference information acquired from the update difference conversion unit 246 to the mobile terminal device 100 and the mobile terminal device 100a. The control information storage unit 250 stores control information such as operation information used for processing by the difference data generation unit 240.

The communication unit 260 performs data communication with the mobile terminal device 100 and the mobile terminal device 100a. When the communication unit 260 receives operation information from the mobile terminal devices 100 and 100a, the communication unit 260 outputs the received operation information to the operation information acquisition unit 241. Moreover, when the communication unit 260 acquires difference information from the screen update notification unit 247, the communication unit 260 transmits the difference information to the mobile terminal devices 100 and 100a.

Figure 7:
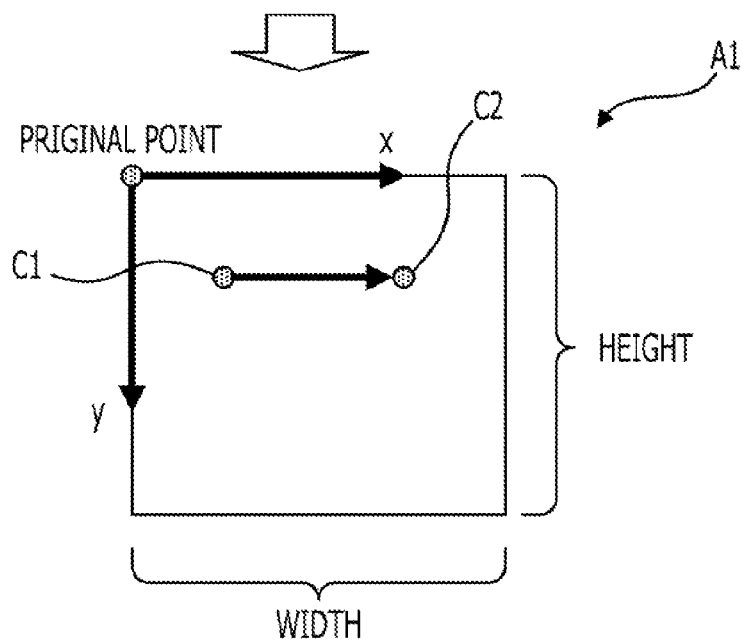
FIG. 7 is an example of a data structure of an operation data table.

FIG. 7 is an example of a data structure of an operation data table. An operation data table 251 is acquired by the operation information acquisition unit 241, and stored in the control information storage unit 250. The operation data table 251 includes items for an item number, an operation time, an operation coordinate, and display area information. Pieces of information for each of the items arranged horizontally are associated with each other and indicate one piece of operation information.

A number to identify a record is set in the item number. A time when an operation input is accepted (for example, year, month, date, hour, minute, and second) is set in the operation time (FIG. 7 illustrates an example in which hour, minute, and second are set). A coordinate that indicates a position on an OS screen to which an operation input is accepted is set in the operation coordinate. Information to identify the current display area is set in the display area information.

The display area information further includes items for an original point, a width, and a height. A coordinate on the OS screen that corresponds to an original point on a screen displayed on the display 106a is set in the original point. A value that indicates a width of a screen that is currently displayed on the display 106a is set in the width. The width is information indicating a horizontal distance (x-direction) from an original point. A value indicating a height of a screen currently displayed on the display 106a is set in the height. The height is information indicating a vertical distance (y-direction) from an original point.

Here, it is assumed that a top left of a screen displayed on the display 106a is an original point, a right direction from the original point is a positive x-direction, and a downward direction from the original point is a positive y-direction.

For example, the item number "1," the operation time, "08:20:20:54," and the operation coordinate, "(200,100)," are set in the operation data table 251. Moreover, the original point "(50, 50)," the width "500" pixels, and the height "600" pixels are set for the display area information in the operation data table 251.

The record of the item number "1" indicates that a time when the operation input is accepted is at 08:20:20:54. Moreover, the record of the item number "1" indicates that an input (for example, a change from "off" to "on" of the touch panel 107a) to a coordinate, (x, y)=(200, 100) over the screen by the operation input is detected. The record of the item number "1" indicates a coordinate to start a scroll operation. Furthermore, the record of the item number "1" indicates that when the operation input is accepted, the original point on the screen displayed on the display 106a corresponds to (x,y)=(50,50) over the OS screen and a width of the screen displayed on the display 106a is 500 pixels and the height of that is 600 pixels.

Moreover, for example, the item number "2," the operation time, "08:20:20:64," and the operation coordinate, "(500, 100)," are set in the operation data table 251. Moreover, the original point "(50, 50)," the width "500" pixels and the height "600" pixels are set for the display area information in the operation data table 251.

The record of the item number "2" indicates that a time when the operation input is accepted is at 08:20:20:64. Moreover, the record of the item number "2" indicates an input (for example, a change from "on" to "off" of the touch panel 107a) to a coordinate (x, y)=(500, 100) by the operation input over the screen is detected. The record of the item number "2" indicates a coordinate to end the scroll operation.

When a touch operation for the touch panel 107a is assumed, a scroll operation may be identified by the operation information of the item numbers "1" and "2." FIG. 7 illustrates a screen A1 displayed on the display 106a. For example, the record of the item number "1" corresponds to a coordinate C1, while the record of the item number "2" corresponds to a coordinate C2. In other words, the operation information allows a scroll operation by a user from the coordinate C1 to the coordinate C2 to be identified.

The same may apply to an operation for the keypad 107b. For example, if there is an operation key indicating a right direction, operation information corresponding to the item number "1" may be acquired based on a coordinate where a pointer displayed on the screen A1 is present at a time when pressing the operation key is started. The pointer position is moved according to a press of the operation key and operation information for the item number "2" is acquired at a time when pressing the key is released.

The operation data table 251 is generated for each mobile terminal device. For example, the operation information acquisition unit 241 stores each table by associating with identification information of each mobile terminal device when operation information of the mobile terminal device 100 and the mobile terminal device 100a is managed.

Figure 8:
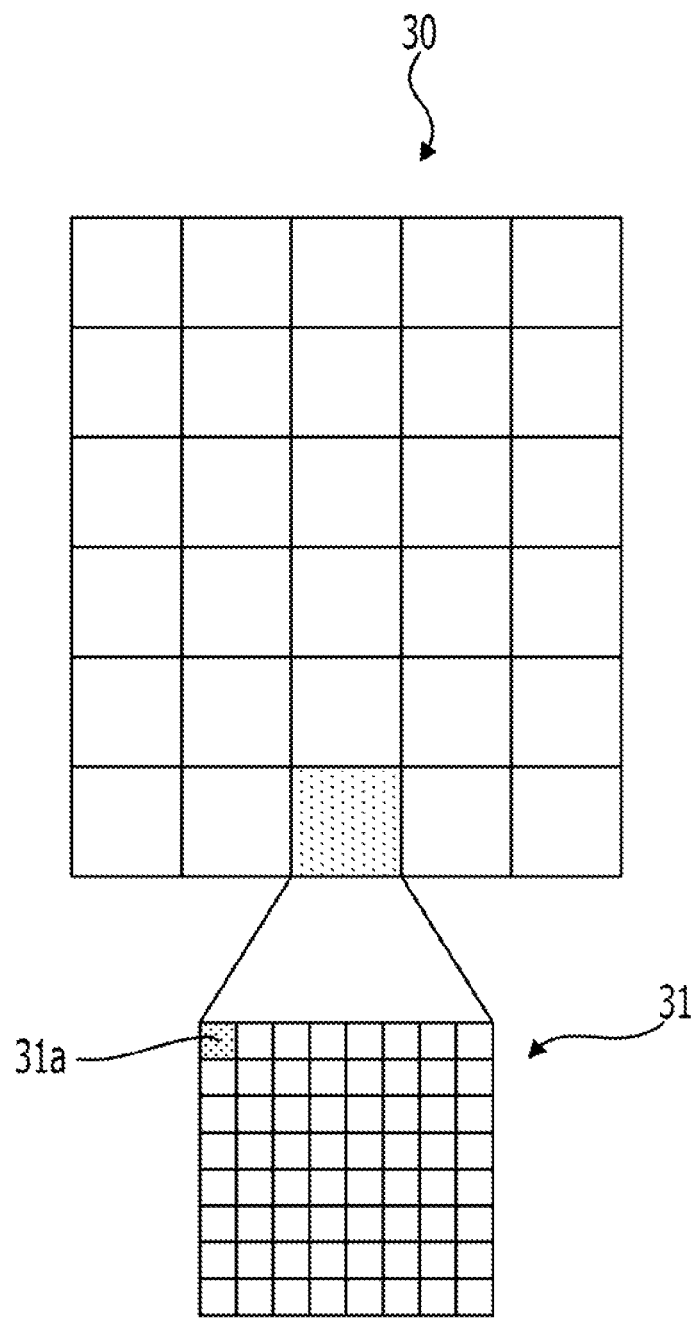
FIG. 8 illustrates an example of a map configuration of a screen.

FIG. 8 illustrates an example of a map configuration of a screen. A map 30 is used when the update frequency determination unit 245 determines update frequency by scroll operations. The map 30 corresponds to a screen area displayed on the display 106a. The map 30 divides the screen area into pixel areas with a specified size. The unit of one pixel area is referred to as a mesh 31. The mesh 31 includes the numbers of pixels 31a. The mesh 31 is made up of, for example, 8 pixels×8 pixels.

The update difference creation unit 244 sequentially extracts predicted update frames corresponding to a scroll area on the OS screen from the frame buffer 230 and outputs update difference information (information indicating an update area (pixels)) between predicted update frames to the update frequency determination unit 245. The update frequency determination unit 245 applies update difference information to the map 30 to determine whether each mesh is updated and counts the update frequency for each mesh.

Figure 9A:
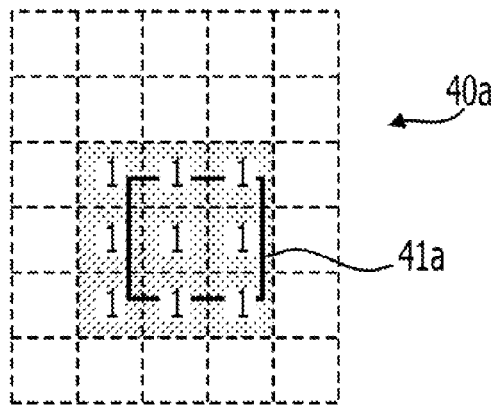
FIGS. 9A, 9B, and 9C illustrate an example to determine an update frequency.
Figure 9B:
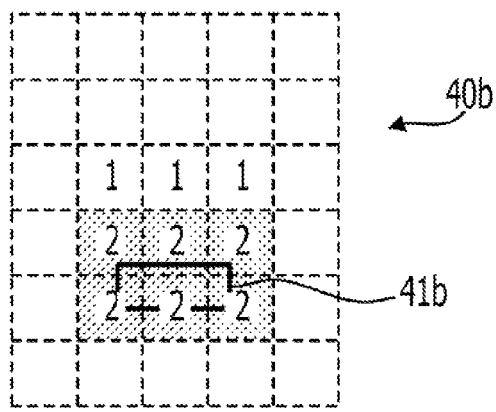
Figure 9C:
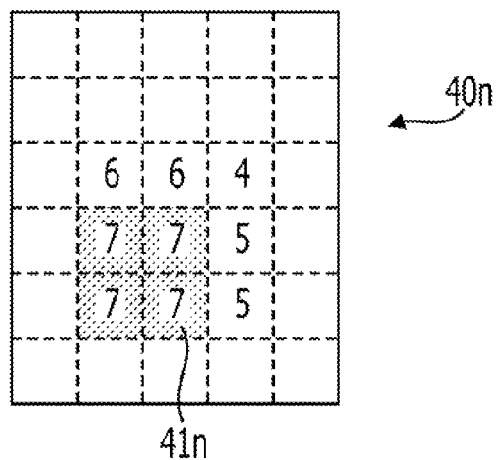

FIGS. 9A, 9B, and 9C illustrate a method to determine an update frequency. FIG. 9A illustrates a map 40a. FIG. 9B illustrates a map 40b. FIG. 9C illustrates a map 40n. The maps 40a, 40b, and 40n illustrate states of the map when the update frequency determination unit 245 sequentially receives information indicating an area that is updated (update area) from the update difference creation unit 244.

An update area 41a and an update area 41b indicate update areas. The update area is an area updated from a previous predicted update frame. A mesh that includes a pixel that overlaps with the update area is determined to be "updated." Numbers indicated in each mesh represent the number of changes that each mesh is changed at a time when the update area is applied over each map. Moreover, numbers indicated in each mesh of the map 40n represent the number of changes each mesh is changed at a time when all of the predicted update frames for a scroll target area are applied. Meshes with no number in the maps 40a, 40b, and 40n represent that the number of times the meshes are changed is 0.

The map 40a illustrates an area that is updated when a predicted update frame subsequent to a screen that is currently displayed on the display 106a is applied. In this case, 1 is added to the number of changes for meshes that overlap with the update area 41a. The number of changes is 0 for the currently displayed screen. Accordingly, the number of changes is updated to "1" for the meshes that overlap with the update area 41a.

The map 40b illustrates a case in which a predicted update frame immediately after the state of the map 40a is applied. In this case, "1" is added to the number of changes of meshes that overlap with the update area 41b. The number of changes of the meshes that overlap with the update area 41b is "1." Accordingly, the number of changes of the meshes that overlap with the update area 41b is updated to "2."

The map 40n is obtained in the end when the update areas are applied over the map for all of the predicted update frames. The update frequency determination unit 245 determines whether there is any mesh that exceeds the number of changes in a specified period, in other words, the change frequency is a threshold or more. In the example of the map 40n, when a threshold is 7, the mesh 41n is determined to be a threshold 7 or more. The update frequency determination unit 245 determines whether difference information to be provided to the mobile terminal device 100 and the mobile terminal device 100a is a moving image format or a still image format based on whether the change frequency is at least at the threshold.

The threshold may be determined by an administrator of the server device 200 as appropriate. For example, the threshold is determined by processing capabilities of the mobile terminal device 100 and the mobile terminal device 100a, and the server device 200. Alternatively, a user of the mobile terminal device 100 and the mobile terminal device 100a may change the threshold.

Processing procedures of the thin client system configured as described above will be described. An entire procedure of screen update processing will be described and procedures for each screen update processing will be described.

Figure 10:
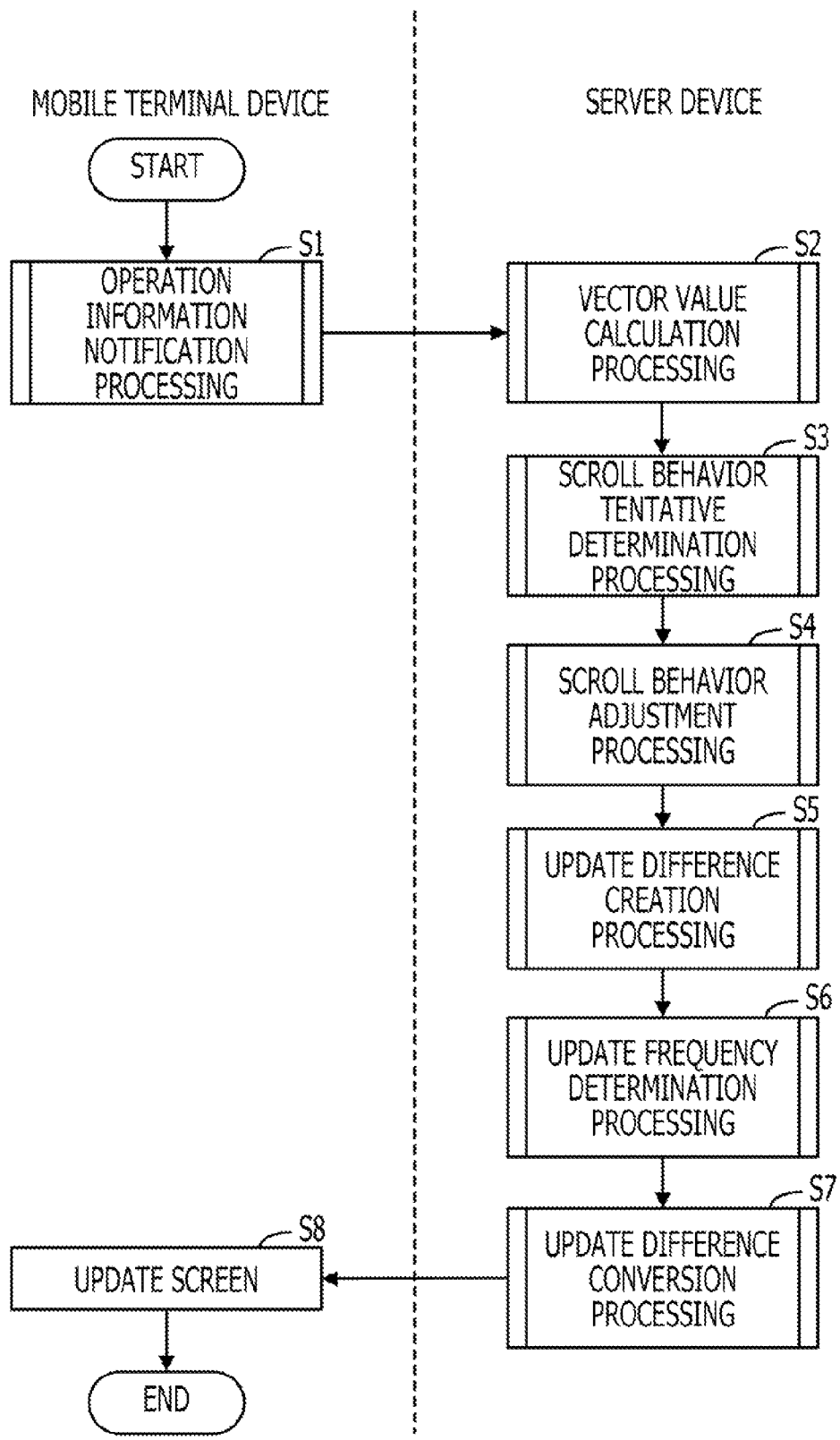
FIG. 10 is a flow chart illustrating an entire screen update processing of the mobile terminal device according to the second embodiment.

FIG. 10 is a flow chart illustrating an entire screen update processing of the mobile terminal device according to the second embodiment. Hereinafter, the processing illustrated in FIG. 10 will be described along with operation numbers.

(Operation S1) The mobile terminal device 100 acquires operation information according to an operation input by a user and transmits the acquired operation information to the server device 200. A period to notify operation information by the mobile terminal device 100 is, for example, 0.1 second.

(Operation S2) The server device 200 acquires vector information of a scroll operation based on the operation information received from the mobile terminal device 100. (Operation S3) The server device 200 tentatively determines a scroll behavior based on the vector information.

(Operation S4) The server device 200 adjusts the tentatively determined scroll behavior. For example, the server device 200 adjusts a frame rate and so on. Accordingly, the server device 200 determines the scroll behavior.

(Operation S5) The server device 200 extracts a predicted update frame based on the determined scroll behavior. (Operation S6) The server device 200 counts the number of changes of each mesh for predicted update frames in time series and counts an update frequency of a screen of the scroll operation. The server device 200 determines whether the difference information is a moving image format or a still image format based on the counted update frequency.

(Operation S7) The server device 200 generates difference information with the determined format. For example, when the difference information is generated with the moving image format, image information sequentially extracted from the frame buffer 230 is encoded to generate difference information with the moving image format. The server device 200 transmits the difference information to the mobile terminal device 100.

(Operation S8) The mobile terminal device 100 updates a screen displayed on the display 106a based on the difference information received from the server device 200. As described above, screen update processing of the thin client system is performed. Each of the above-described operations will be described in detail. Operation information notification processing of Operation S1 will be described.

Figure 11:
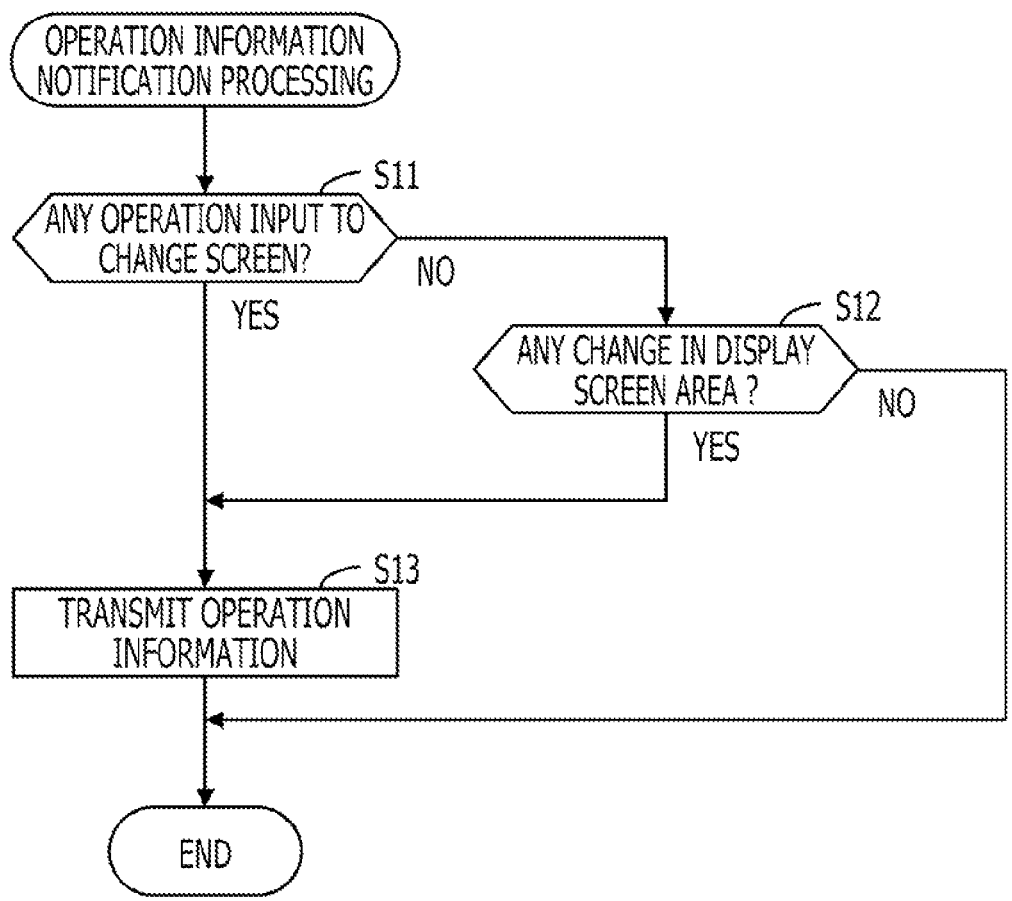
FIG. 11 is a flow chart illustrating an operation information notification processing according to the second embodiment.

FIG. 11 is a flow chart illustrating an operation information notification processing according to the second embodiment. Hereinafter, processing illustrated in FIG. 11 will be described along with operation numbers. (Operation S11) The operation information acquisition unit 110 determines whether there is any input operation that involves a screen change (scroll operation). If there is any operation input that involves a screen change, the processing proceeds to Operation S13. If there is no operation input that involves a screen change, the processing proceeds to Operation S12.

(Operation S12) The operation information acquisition unit 110 determines whether there is any change in a display screen area by processing of an OS or applications. If there is any change in the display screen area, the processing proceeds to Operation S13. If there is no change in the display screen area, the processing is completed.

(Operation S13) The operation information acquisition unit 110 acquires operation information according to an operation input. When the operation information acquisition unit 110 determines there is a change in the display screen area, the operation information acquisition unit 110 acquires changed contents of the display screen area from the OS or the applications. The operation information acquisition unit 110 generates information that corresponds to the operation information based on the changed contents acquired from the OS or the applications. The operation information acquisition unit 110 outputs the operation information to the operation information notification unit 120. The operation information notification unit 120 transmits the operation information to the server device 200 through the communication unit 130.

As described above, the operation information acquisition unit 110 acquires operation information whenever an operation input is detected. The operation information notification unit 120 notifies operation information to the server device 200.

Processing to calculate a vector value at Operation S2 in FIG. 10 will be described.

Figure 12:
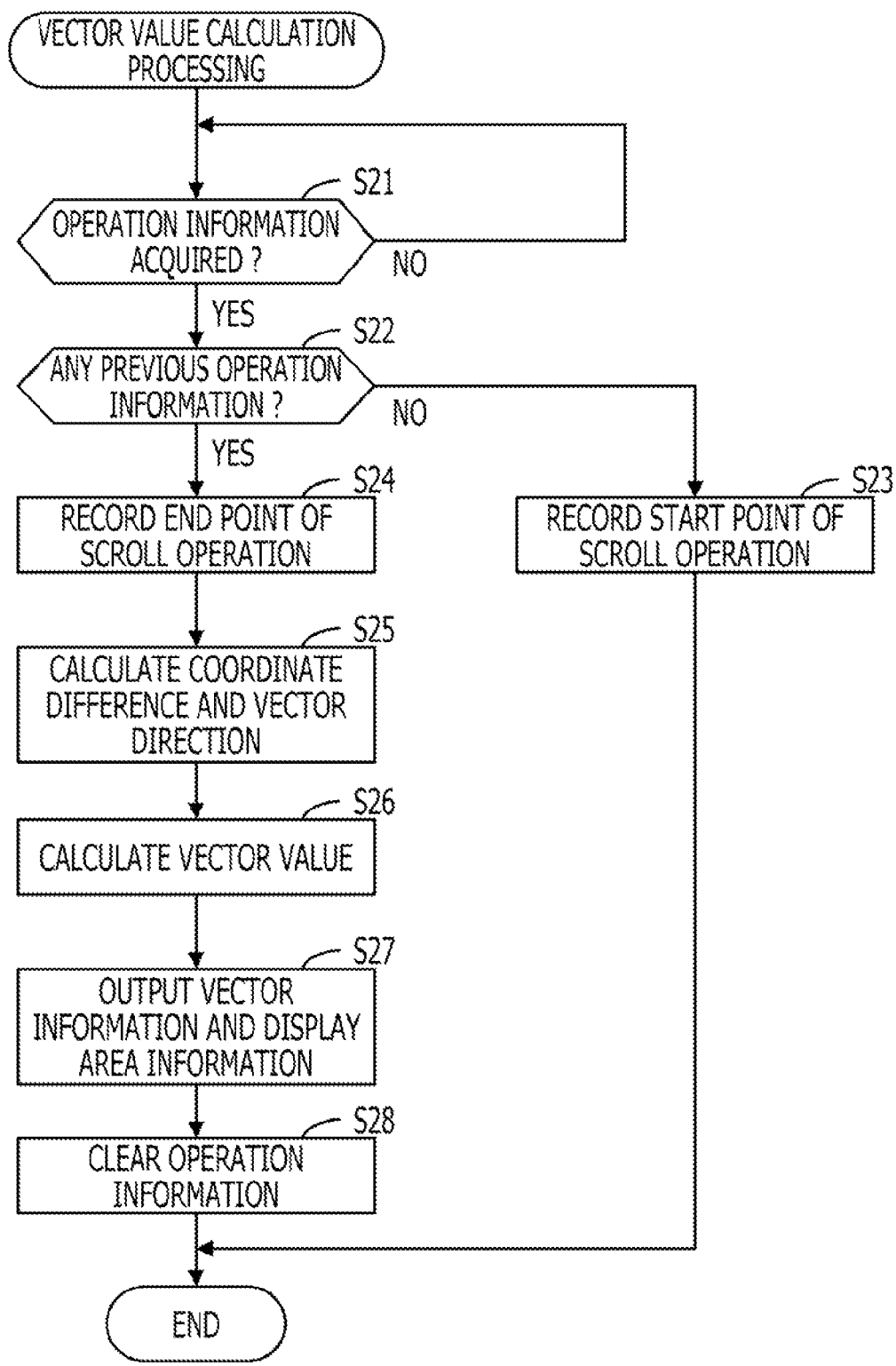
FIG. 12 is a flow chart illustrating vector value calculation processing according to the second embodiment.

FIG. 12 is a flow chart illustrating vector value calculation processing according to the second embodiment. Hereinafter, processing illustrated in FIG. 12 will be described along with operation numbers.

(Operation S21) The operation information acquisition unit 241 determines whether operation information is acquired from the mobile terminal device 100 through the communication unit 260. If the operation information is acquired, the processing proceeds to Operation S22. If the operation information is not acquired, the operation information acquisition unit 241 waits until the operation information is acquired.

(Operation S22) The operation information acquisition unit 241 refers to the control information storage unit 250 and determines whether there is any previous operation information. If there is no previous operation information, the processing proceeds to Operation S23. If there is the previous operation information, the processing proceeds to Operation S24.

(Operation S23) The operation information acquisition unit 241 records the operation information currently received in the operation data table 251 stored in the control information storage unit 250. The operation information corresponds to a start point of the scroll operation.

(Operation S24) The operation information acquisition unit 241 records the operation information currently received in the operation data table 251 stored in the control information storage unit 250. The operation information corresponds to an end point of a scroll operation.

(Operation S25) The vector value calculation unit 242 refers to the operation data table 251 and calculates a difference of coordinates between a start point and an end point. In the example of the operation data table 251, a difference of the coordinates is a difference between the start point (200, 100) and the end point (500, 100), thereby the difference of the coordinates is (300, 0). The vector value calculation unit 242 calculates a vector direction of the scroll operation based on the calculated difference of coordinates. The vector direction may be determined by detecting whether the vector direction of the scroll operation corresponds to a direction among a plurality of specified directions or by calculating how much the vector of the scroll operation is angled to a vector with a specified direction. In the example of the above-described difference of the coordinates (300, 0), the vector direction may be determined as an x-direction.

(Operation S26) The vector value calculation unit 242 calculates a vector length per unit time (hereinafter referred to as a vector value) by converting a vector length indicated by the difference of the coordinates. For example, the difference of coordinates is converted into the difference of coordinates for one second. In the example of the operation data table 251, operation time at the start point is 8:20:20:54 while that of the end time is 8:20:20:64 and the time difference is 0.1 second. Hence, a vector value obtained by converting the vector length 300 indicated by the difference of coordinates into one second is 3000 pixels per second. The vector value calculation unit 242 obtains vector information that is 3000 pixels per second to the "x" direction.

(Operation S27) The vector value calculation unit 242 outputs the acquired vector information and the display area information to the scroll behavior determination unit 243.

(Operation S28) The vector value calculation unit 242 clears a record recorded in the operation data table 251.

As described above, the vector value calculation unit 242 acquires vector information corresponding to the scroll operation based on the operation information. The vector value calculation unit 242 outputs the vector information to the scroll behavior determination unit 243.

The vector value calculation unit 242 may be provided to the mobile terminal device 100 and the mobile terminal device 100a. In this case, the server device 200 may execute processing thereafter by acquiring vector information acquired by the mobile terminal device 100 and the mobile terminal device 100a. For example, when the server device 200 acquires vector information, the server device 200 may not appropriately acquire the vector information if operation information is missing due to an influence such as a load on the network. In order to address this, acquiring vector information by the mobile terminal device 100 and the mobile terminal device 100a allows appropriate vector information to be almost always acquired.

Figure 13:
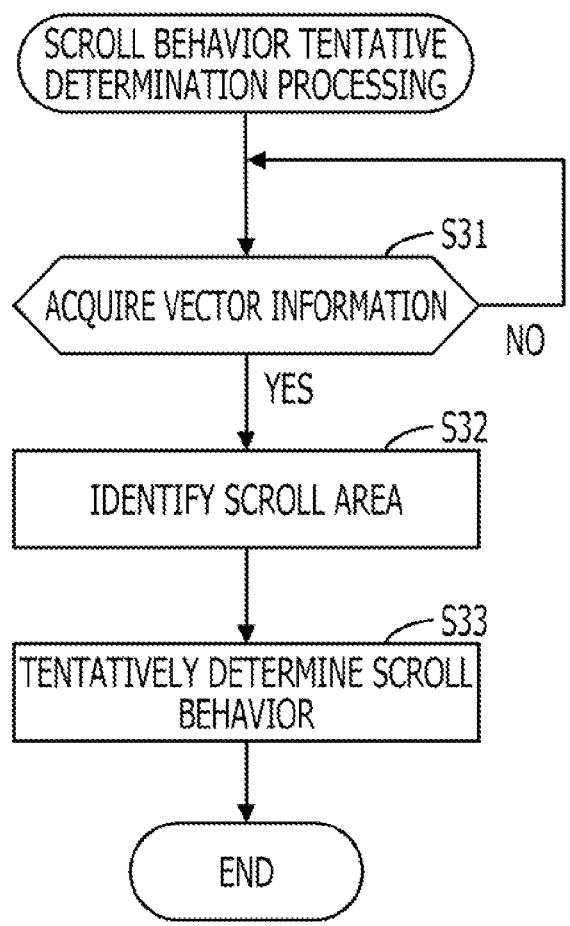
FIG. 13 is a flow chart illustrating scroll behavior tentative determination processing according to the second embodiment.

Scroll behavior tentative determination processing at Operation S3 in FIG. 10 will be described. FIG. 13 is a flow chart illustrating scroll behavior tentative determination processing according to the second embodiment. Hereinafter, processing illustrated in FIG. 13 will be described along with operation numbers.

(Operation S31) The scroll behavior determination unit 243 determines whether vector information is acquired from the vector value calculation unit 242. If the vector information is acquired, the processing proceeds to Operation S32. If the vector information is not acquired, the scroll behavior determination unit 243 waits until the vector information is acquired (processing proceeds to Operation S31).

(Operation S32) The scroll behavior determination unit 243 determines a scroll area per unit time (for example, per one second) based on the vector information. For example, vector information is assumed to be 3000 pixels per second to the "x" direction. The scroll behavior determination unit 243 moves an area indicated by the display area information based on the vector information on the OS screen. A trajectory of the moved area is a scroll area. In the example of the operation data table 251, an area of a width of 3,500 pixels and a height of 600 pixels may be identified as a scroll area by assuming an original point (a point on the upper left of the screen) is a coordinate (50, 50) on the OS screen.

(Operation S33) The scroll behavior determination unit 243 acquires a specified frame rate. The scroll behavior determination unit 243 calculates the number of frames corresponding to a scroll area based on the frame rate and calculates a center distance L among the frames. The center distance L indicates a distance between center points (a point where a half of the frame width and a half of the frame height) of screens displayed by respective frames on the OS screen. For example, a frame rate is assumed to be 30 frames per second (fps). A center distance L is 100 pixels that are obtained by dividing the vector value "3000 pixels/second" by 30 fps. The center distance L indicates an amount of a scroll from one frame to the next frame on the OS screen.

As described above, the scroll behavior determination unit 243 tentatively determines a scroll behavior. A case is assumed in which a vector value becomes large. In this case, when scroll behavior is determined by the processing, a smooth drawing may not be displayed at the mobile terminal device 100 and the mobile terminal device 100a due to significant increase in the center distance L among frames when difference information is generated by a moving image format. For example, when a vector value is 30,000 pixels per second, the center distance L is 1,000 pixels. As a result, frames are generated with a long distance on the OS screen.

Accordingly, in this case, the scroll behavior is adjusted and the frame rate is changed. In the above-described example, when the center distance L becomes large, the frame rate is adjusted to a greater value. The processing will be described by referring to FIG. 14.

Figure 14:
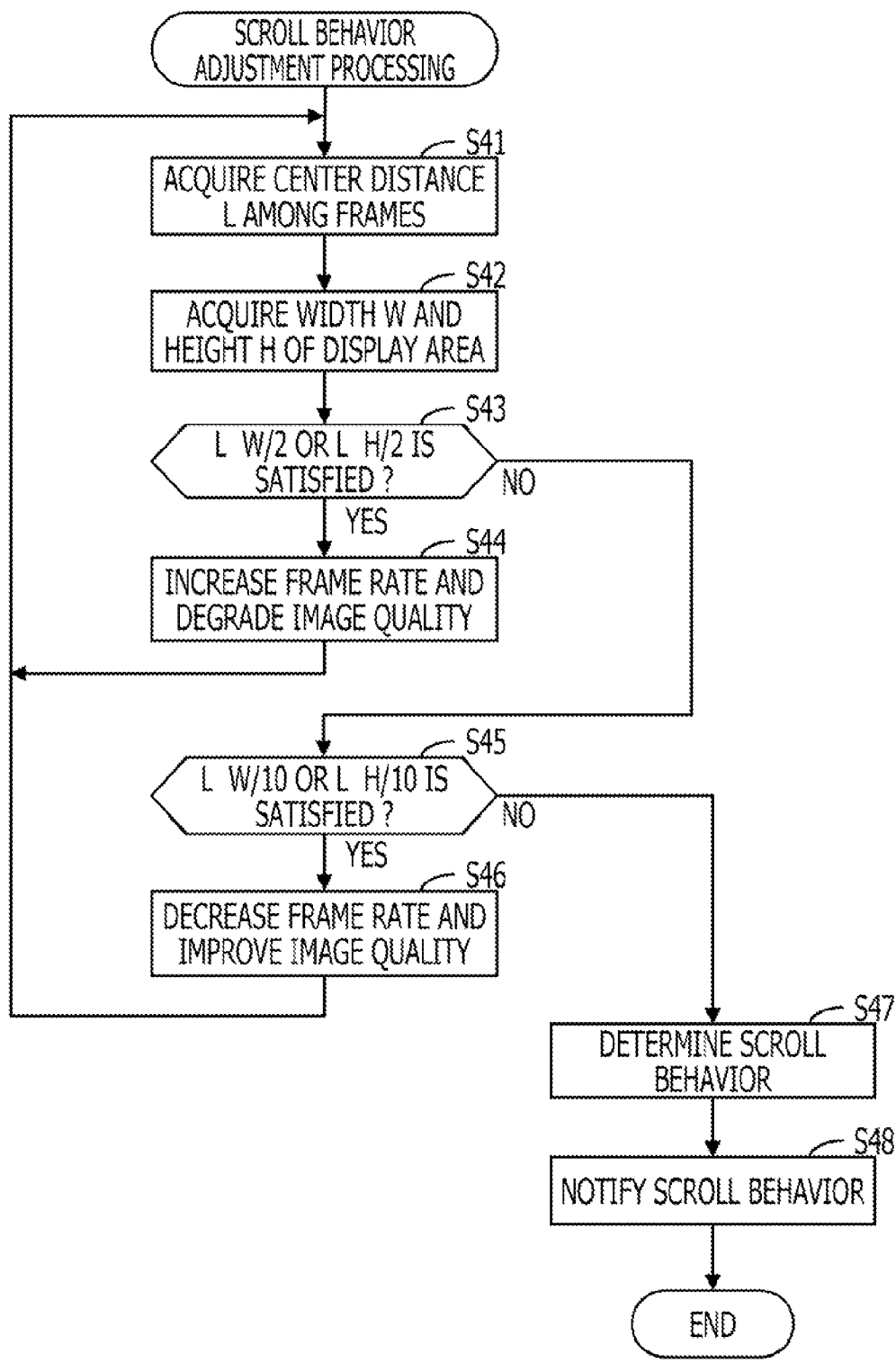
FIG. 14 is a flow chart illustrating scroll behavior adjustment processing according to the second embodiment.

Scroll behavior adjustment processing of Operation S4 in FIG. 10 is described. FIG. 14 is a flow chart illustrating scroll behavior adjustment processing according to the second embodiment. Hereinafter, processing illustrated in FIG. 14 will be described along with operation numbers.

(Operation S41) The scroll behavior determination unit 243 acquires a center distance L among frames based on the current frame rate. The method to calculate the center distance L is as described in Operation S33 of FIG. 13.

(Operation S42) The scroll behavior determination unit 243 acquires a width W and a height H of a screen area displayed on the display 106a based on the display area information. (Operation S43) The scroll behavior determination unit 243 determines whether at least one of $L \geq W/2$ or $L \geq H/2$ is satisfied. If one of the $L \geq W/2$ or $L \geq H/2$ is satisfied, processing proceeds to Operation S44, otherwise processing proceeds to Operation S45.

(Operation S44) The scroll behavior determination unit 243 increases the frame rate. The amount to increase may be, for example, a specified value or ratio. Moreover, the scroll behavior determination unit 243 degrades image quality of a frame. For example, a frame size (a size for one frame) is reduced by reducing the frame resolution and the number of colors. The amount to reduce the frame size corresponds to an amount to cancel out the increase of the frame rate. The reason to perform the processing is described below. In other words, an amount of data to be transmitted to the mobile terminal device 100 increases with an increase of the frame rate, and as a result, an operation response may be degraded at the mobile terminal device 100. Thus, an increase of a transmission data amount with an increase of the frame rate may be suppressed by degrading image quality of the frames. The processing proceeds to Operation S41.

(Operation S45) The scroll behavior determination unit 243 determines whether at least one of $L \leq W/10$ or $L \leq H/10$ is satisfied. If one of $L \leq W/10$ or $L \leq H/10$ is satisfied, processing proceeds to Operation S46, otherwise, the processing proceeds to Operation S47.

(Operation S46) The scroll behavior determination unit 243 reduces the frame rate. The amount to decrease may be, for example, a specified value or ratio. Moreover, the scroll behavior determination unit 243 improves image quality of a frame. For example, a frame size is increased by increasing the frame resolution or the number of colors. The amount to increase the frame size corresponds to an amount to cancel out the decrease of the frame rate. The processing proceeds to Operation S41.

(Operation S47) The scroll behavior determination unit 243 determines scroll behavior based on information such as the current frame rate and image quality. (Operation S48) The scroll behavior determination unit 243 notifies the update difference creation unit 244 of the determined scroll behavior.

As described above, the scroll behavior determination unit 243 determines a frame rate included in the tentatively determined scroll behavior. For example, when the center distance L is too long, a frame rate is increased to degrade image quality of the frame. Conversely, when the center distance L is too short, a frame rate is decreased to improve image quality of the frame.

Accordingly, smooth drawings at the mobile terminal device 100 may be achieved when difference information is transmitted with the moving image format. An amount of transmission data of difference information to be transmitted to the mobile terminal device 100 and the mobile terminal device 100a may be controlled so that the amount of transmission data of difference information is not greatly increased.

Figure 15:
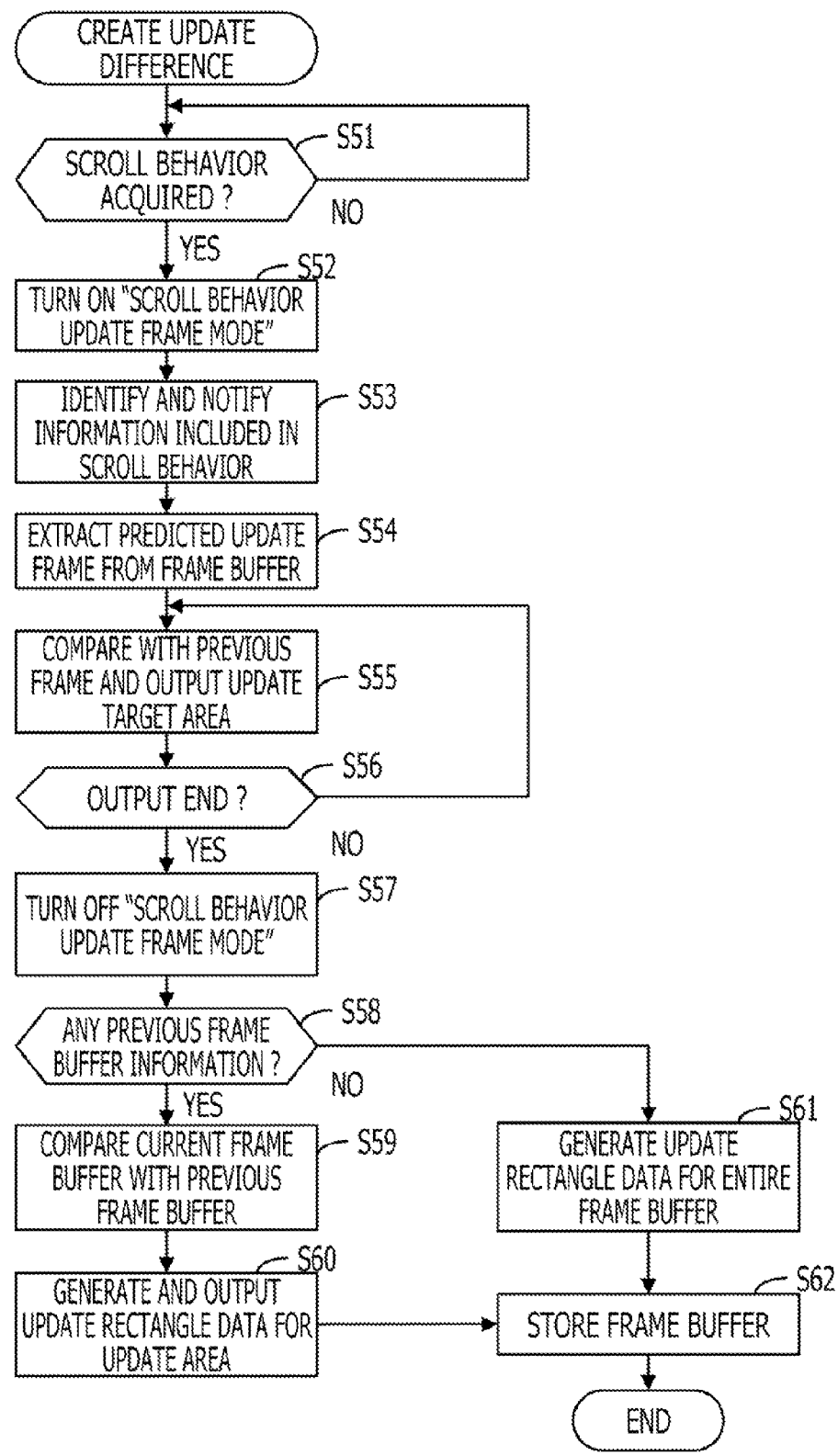
FIG. 15 is a flow chart illustrating update difference creation processing according to the second embodiment.

Update difference creation processing of Operation S5 in FIG. 10 will be described. FIG. 15 is a flow chart illustrating update difference creation processing according to the second embodiment. Hereinafter, processing illustrated in FIG. 15 will be described along with operation numbers.

(Operation S51) The update difference creation unit 244 determines whether the update difference creation unit 244 acquires scroll behavior from the scroll behavior determination unit 243. If the update difference creation unit 244 acquires scroll behavior, processing proceeds to Operation S52. If the update difference creation unit 244 does not acquire scroll behavior, the update difference creation unit 244 waits until the update difference creation unit 244 receives the scroll behavior (processing proceeds to Operation S51).

(Operation S52) The update difference creation unit 244 turns on "scroll behavior update frame mode." The "scroll behavior update frame mode" is a mode to temporarily output predicted update frames to the update frequency determination unit 245.

(Operation S53) The update difference creation unit 244 identifies a scroll area, a frame size, a frame rate, and a center distance L. Moreover, the update difference creation unit 244 notifies the update frequency determination unit 245 of scroll behavior.

(Operation S54) The update difference creation unit 244 extracts predicted update frames in order of time series from the frame buffer 230 based on the identified each piece of information. A start point of frames to be extracted is a frame corresponding to a screen area that is currently displayed in the display 106a. In other words, predicted update frames are extracted by the identified frame rate and size for each area that is away from the start point for the center distance L.

(Operation S55) The update difference creation unit 244 compares an extracted predicted update frame with the previous predicted update frame and sequentially outputs information of the update area to the update frequency determination unit 245.

(Operation S56) The update difference creation unit 244 determines whether output of information of update area is completed for all of the predicted update frames in the scroll area. If the output is completed, processing proceeds to Operation S57. If the output is not completed, processing proceeds to Operation S55.

(Operation S57) The update difference creation unit 244 turns off "scroll behavior update frame mode." The update difference creation unit 244 outputs difference information to the update difference conversion unit 246 (corresponds to operations S58 to S62).

(Operation S58) The update difference creation unit 244 refers to the frame buffer 230 and determines whether there is any previous frame buffer information. If there is the previous frame buffer information, processing proceeds to Operation S59. If there is no previous buffer information, processing proceeds to Operation S61.

(Operation S59) The update difference creation unit 244 compares the current frame buffer information with the previous frame buffer information. The comparison target area corresponds to an area of a screen that is currently displayed on the display 106a.

(Operation S60) The update difference creation unit 244 generates update rectangle data for an update area of the screen displayed on the display 106a, and outputs the generated data to the update difference conversion unit 246. (Operation S61) The update difference creation unit 244 generates update rectangle data for the entire screen displayed on the display 106a and outputs the generated data to the update difference conversion unit 246.

(Operation S62) The update difference creation unit 244 stores the current frame buffer information in the frame buffer 230. Accordingly, the update difference creation unit 244 extracts predicted update frames based on scroll behavior and outputs update difference (information of update area) between each predicted update frame and the previous predicted update frame to the update frequency determination unit 245. The update frequency determination unit 245 determines update frequency of the screen due to scroll based on the information.

Figure 16A:
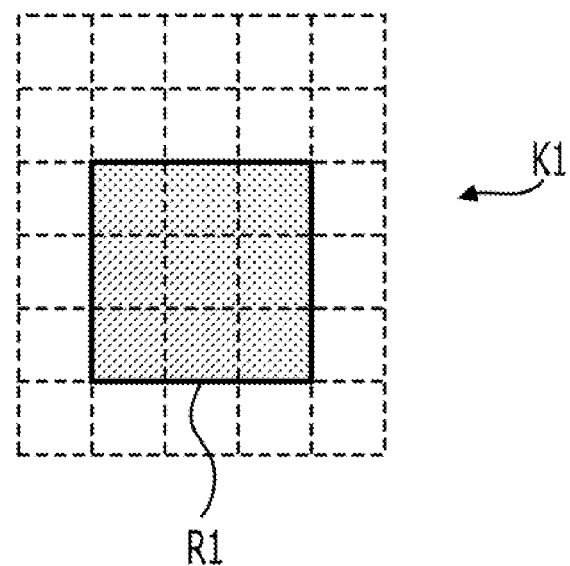
FIGS. 16A and 16B illustrate update rectangles.
Figure 16B:
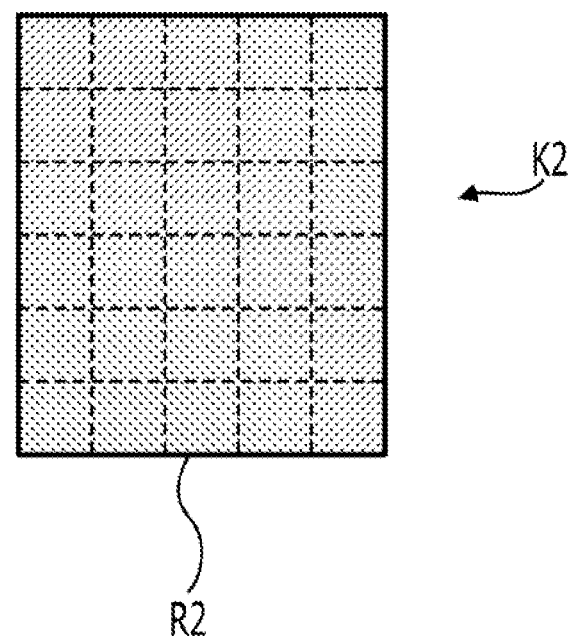

Update rectangle data is described. FIGS. 16A and 16B illustrate update rectangles. FIG. 16A illustrates an update target area in a screen area K1 displayed on the display 106a. The rectangle surrounding the area is update rectangle R1. Data representing the update rectangle R1 corresponds to update rectangle data of Operation S60 described by referring to FIG. 15.

FIG. 16B illustrates an update target area in a screen area K2 displayed on the display 106a. Here, the update target area is all areas of the screen area K2. The rectangle surrounding the area is an update rectangle R2. Data represents the update rectangle R2 corresponding to update rectangle data of Operation S61 described by referring to FIG. 15.

The update difference creation unit 244 may instruct the update difference conversion unit 246 to generate difference information typically for a screen to be updated among a screen displayed on the display 106a. In other words, when the update rectangle R1 is acquired typically for the update part as illustrated in FIG. 16A, the update difference conversion unit 246 may generate difference information typically for an area in the update rectangle R1 for the display screen on the display 106a. The screen display processing unit 180 updates the display screen for the area of the difference information.

Accordingly, an amount of data communication between the mobile terminal devices 100 and 100a and the server device 200 may be reduced and processing load on display processing of the mobile terminal device 100 and 100a may be reduced as well.

Figure 17:
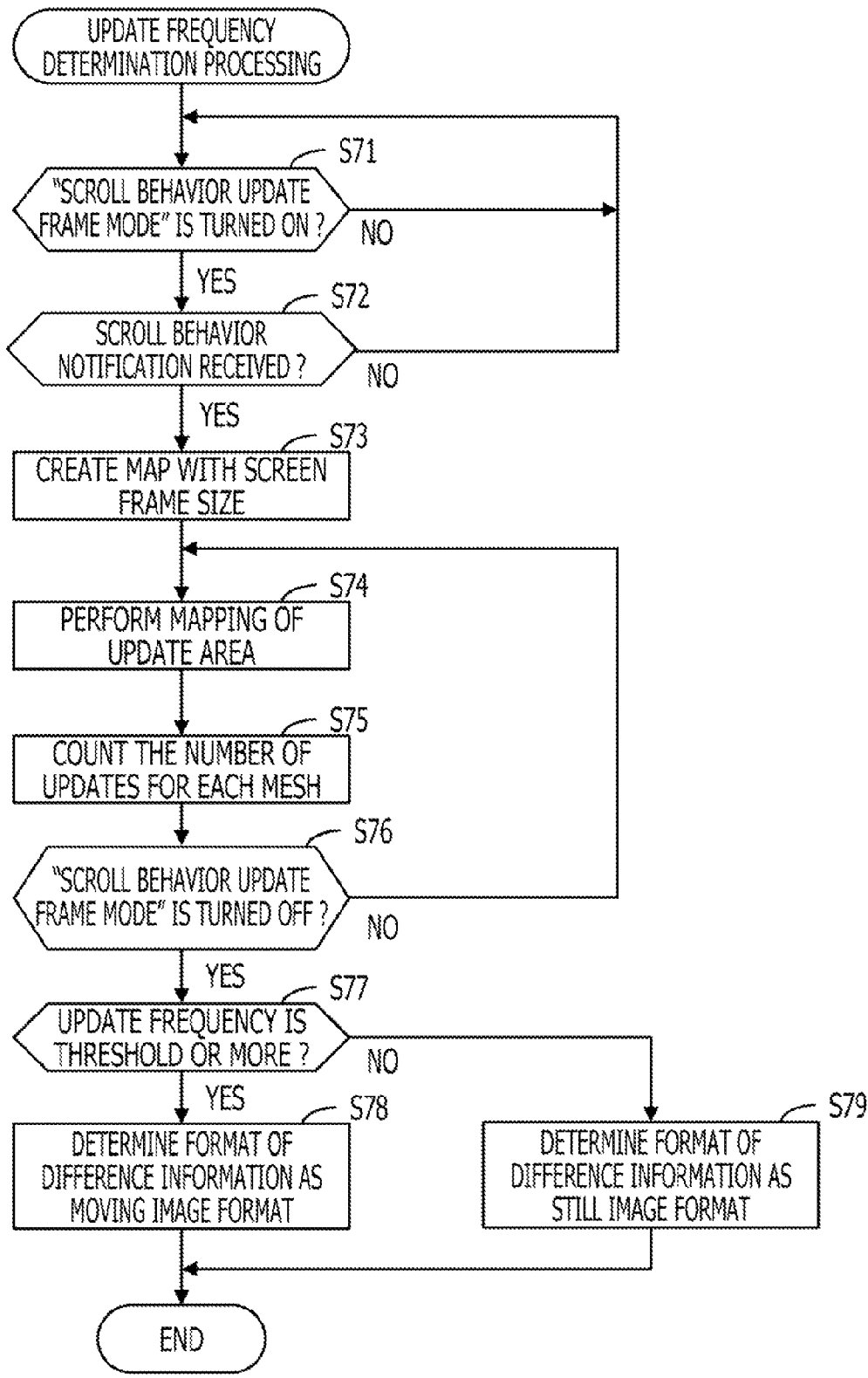
FIG. 17 is a flow chart illustrating screen update high frequency area estimation processing according to the second embodiment.

Update frequency determination processing of Operation S6 in FIG. 10 will be described. FIG. 17 is a flow chart illustrating screen update high frequency area estimation processing according to the second embodiment. Hereinafter, processing illustrated in FIG. 17 will be described along with operation numbers.

(Operation S71) The update frequency determination unit 245 determines whether "scroll behavior update frame mode" of the update difference creation unit 244 is turned on. When the "scroll behavior update frame mode" is turned on, processing proceeds to Operation S72. When the "scroll behavior update frame mode" is turned off, the update frequency determination unit 245 waits until the mode is turned on (processing proceeds to Operation S71).

(Operation S72) The update frequency determination unit 245 determines whether the update frequency determination unit 245 receives a scroll behavior notification from the update difference creation unit 244. If the update frequency determination unit 245 receives the scroll behavior notification, processing proceeds to Operation S73. If the update frequency determination unit 245 does not receive the scroll behavior notification, the update frequency determination unit 245 waits for the notification (processing proceeds to Operation S71).

(Operation S73) The update frequency determination unit 245 creates a map 30 with a screen frame size corresponding to the display screen of the display 106a. (Operation S74) The update frequency determination unit 245 performs mapping of the update area acquired from the update difference creation unit 244 to the map 30.

(Operation S75) The update frequency determination unit 245 counts the number of updates for the updated mesh 31. (Operation S76) The update frequency determination unit 245 determines whether "scroll behavior update frame mode" of the update difference creation unit 244 is turned off. When the "scroll behavior update frame mode" is turned off, processing proceeds to Operation S77. When the "scroll behavior update frame mode" is turned on, processing proceeds to Operation S74.

(Operation S77) The update frequency determination unit 245 determines whether the update frequency counted for each mesh of the map 30 is at least at the specified threshold. If the update frequency is at least at the specified threshold, processing proceeds to Operation S78. If the update frequency is smaller than the specified threshold, processing proceeds to Operation S79.

(Operation S78) The update frequency determination unit 245 determines a format of the difference information to be transmitted to the mobile terminal device 100 as the moving image format. The update frequency determination unit 245 instructs the update difference conversion unit 246 to convert the difference information into the moving image format.

(Operation S79) The update frequency determination unit 245 determines a format of the difference information to be transmitted to the mobile terminal device 100 as the still image format. The update frequency determination unit 245 instructs the update difference conversion unit 246 to convert the difference information into the still image format.

As described above, the update frequency determination unit 245 determines an update frequency. The update frequency determination unit 245 determines whether the format of the difference information is the moving image format or the still image format. The update difference conversion unit 246 generates the difference information with the format determined by the update frequency determination unit 245.

Figure 18:
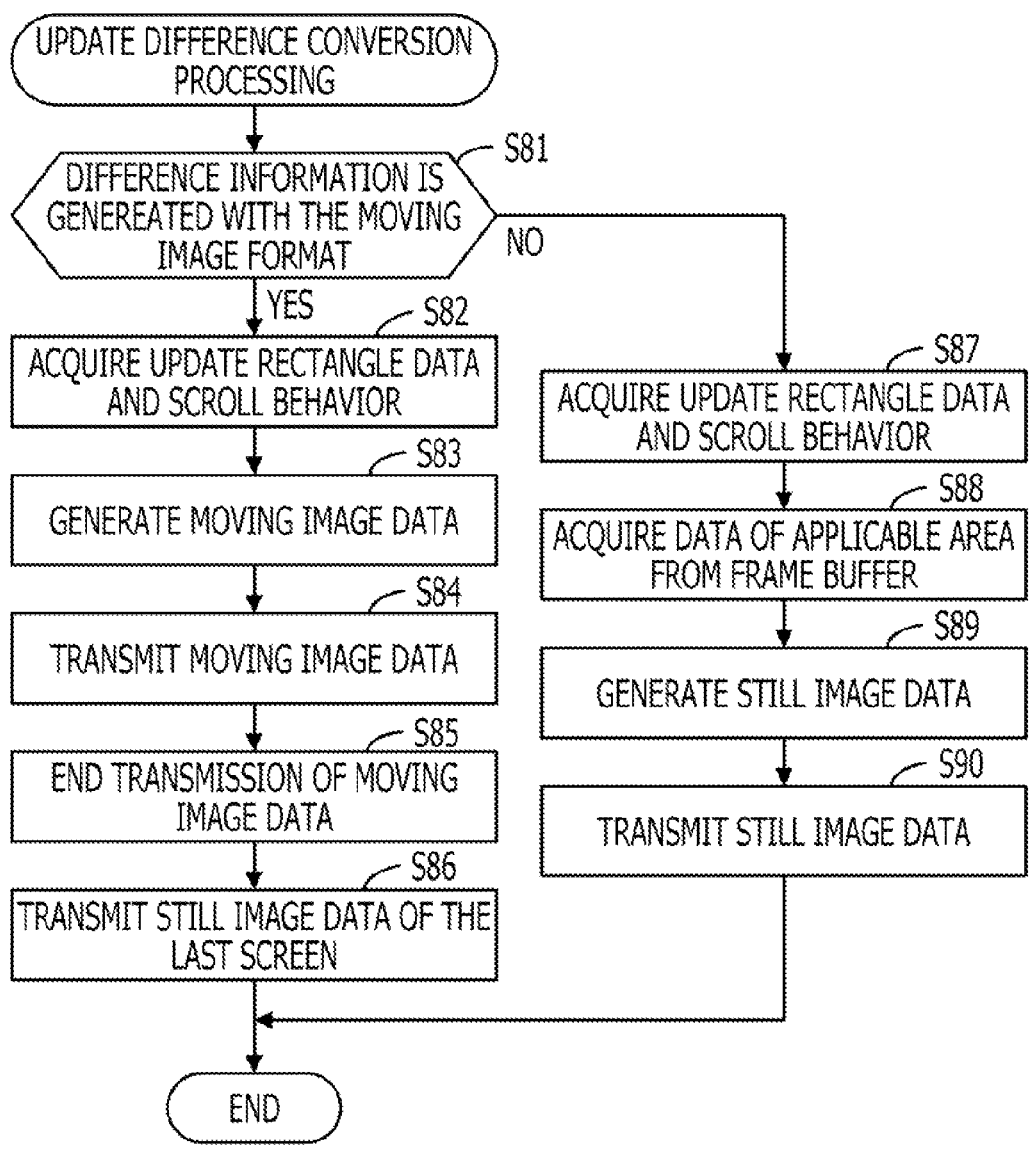
FIG. 18 is a flow chart illustrating update difference conversion processing according to the second embodiment.

Update difference conversion processing of operation S7 in FIG. 10 will be described. FIG. 18 is a flow chart illustrating update difference conversion processing according to the second embodiment. Hereinafter, processing illustrated in FIG. 18 will be described along with operation numbers.

(Operation S81) The update difference conversion unit 246 determines whether the difference information is generated with the moving image format. If the difference information is generated with the moving image format, processing proceeds to operation S82. If the difference information is not generated with the moving image format, processing proceeds to operation S87. The update difference conversion unit 246 determines the difference information is generated with the moving image format when the update difference conversion unit 246 is instructed to generate the difference information with the moving image format by the update frequency determination unit 245. On the other hand, the update difference conversion unit 246 determines the difference information is not generated with the moving image format when the update difference conversion unit 246 is instructed to generate the difference information with the still image format by the update frequency determination unit 245.

(Operation S82) The update difference conversion unit 246 acquires update rectangle data from the update difference creation unit 244. The update difference conversion unit 246 acquires scroll behavior and display area information from the scroll behavior determination unit 243.

(Operation S83) The update difference conversion unit 246 refers to information of the current display screen stored in the frame buffer 230 and generates difference information with the moving image format (moving image data) in which a trajectory of the scroll starting from a position (area) indicated by the display area information is assumed to be an update frame. Various parameters, and information of a center distance L, a frame size, and a frame rate that are used for generating moving image data are included in the scroll behavior. Moreover, a size of an area to be created is determined based on the update rectangle data. The update difference conversion unit 246 outputs generated moving image data to the screen update notification unit 247.

(Operation S84) The screen update notification unit 247 transmits moving image data to the mobile terminal device 100 through the communication unit 260. (Operation S85) The screen update notification unit 247 ends transmission of the moving image data.

(Operation S86) The update difference conversion unit 246 generates still image data for the last screen of the scroll, generates still image data, and outputs the still image data to the screen update notification unit 247. The screen update notification unit 247 transmits the still image data of the last screen to the mobile terminal device 100 through the communication unit 260.

(Operation S87) The update difference conversion unit 246 acquires update rectangle data from the update difference creation unit 244. Moreover, the update difference conversion unit 246 acquires scroll behavior and display area information from the scroll behavior determination unit 243.

(Operation S88) The update difference conversion unit 246 refers to the frame buffer 230 and sequentially acquires data of the scroll area based on the frame rate and the center distance L. The size of an area to be acquired is determined based on the update rectangle data.

(Operation S89) The update difference conversion unit 246 generates the difference information with the still image format (still image data) based on the acquired each data of the scroll area. The update difference conversion unit 246 outputs the generated still image data to the screen update notification unit 247.

(Operation S90) The screen update notification unit 247 transmits the still image data to the mobile terminal device 100 through the communication unit 260. As described above, the update difference conversion unit 246 generates difference information. The update difference conversion unit 246 generates either the difference information with the moving image format (moving image data) or that with the still image format (still image data) according to an instruction by the update frequency determination unit 245 and transmits the generated data to the mobile terminal device 100 or the mobile terminal device 100a.

Figure 19:
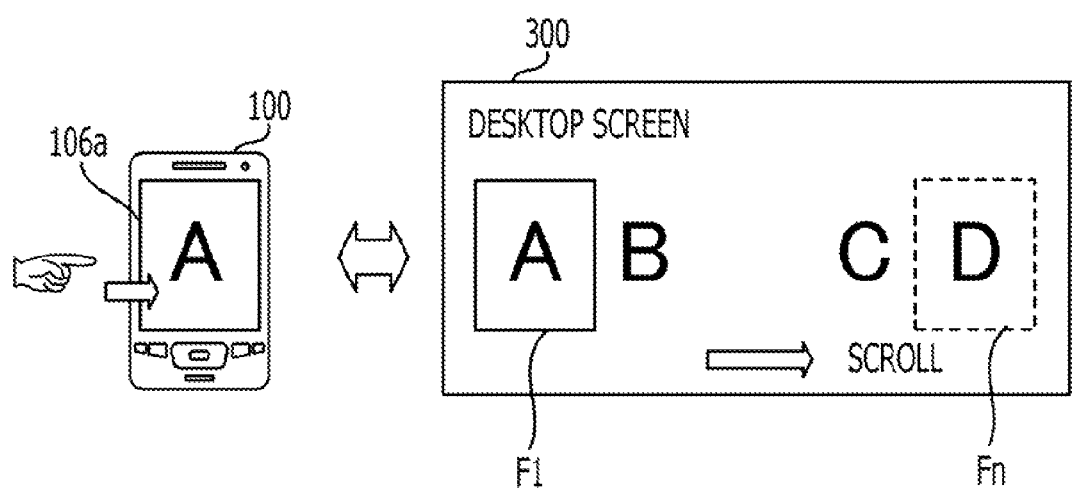
FIG. 19 illustrates an example of a scroll operation.

FIG. 19 illustrates an example of a scroll operation. It is assumed that the display 106a of the mobile terminal device 100 displays a part of a desktop screen 300 provided by the server device 200. A user of the mobile terminal device 100 views the screen displayed on the display 106a and performs a scroll operation to cause the screen to scroll toward the right on the screen. For example, the user touches one point on the touch panel 107a using his or her finger and slides the finger to the right direction with the finger touching the screen. The user releases the finger from the touch panel 107a at the point where the slide ends. The mobile terminal device 100 acquires operation information according to the series of scroll operations and transmits the operation information to the server device 200.

The server device 200 acquires scroll behavior according to the scroll operation. The server device 200 acquires predicted update frames F1, . . . , Fn based on the scroll behavior and determines an update frequency between each of the predicted update frames. The predicted update frame F1 is a predicted update frame corresponding to a start point of the scroll area indicated by the scroll behavior. The predicted update frame Fn is a predicted update frame corresponding to an end point of the scroll area.

Figure 20:
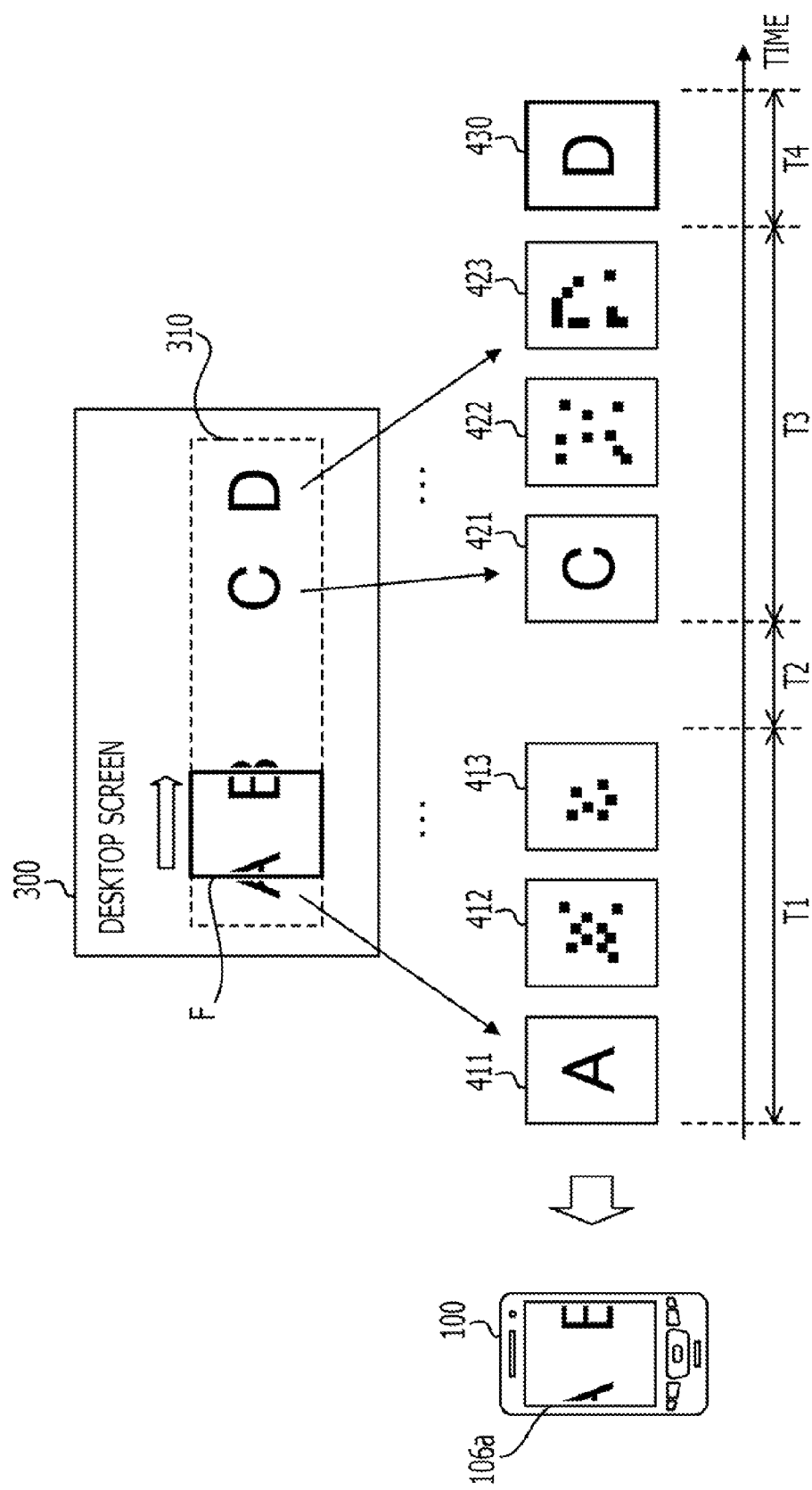
FIG. 20 illustrates an example of transmitting difference information by a moving image format.

The server device 200 transmits the difference information generated with the moving image format to the mobile terminal device 100 when the update frequency is at least at the specified threshold. FIG. 20 illustrates an example of transmitting difference information by the moving image format. It is assumed that the server device 200 refers to the update frequency and determines to transmit difference information with the moving image format (moving image data). The server device 200 sequentially acquires update frames F in the scroll area 310, encodes the update frame F, and generates the moving image data. FIG. 20 illustrates frame data 411, 412, 413, . . . 421, 422, and 423 . . . that make up the moving image data. Here, as a compression method of moving image data, a case in which a Moving Picture Experts Group (MPEG) is used is illustrated. In this case, the frame data 411 and 422 are reference images that are referred to as I pictures, and the frame data 412, 413, 422, and 423 are difference images referred to as P pictures or B pictures. Moreover, the compression method when moving image data is created is not limited to the MPEG but also other compression methods that perform similar compression as the MPEG such as an MPEG2 and an H. 264 may be used.

For example, in a period T1, the frame data 411, 412, 413, . . . is transmitted to the mobile terminal device 100. Moreover, in a period T2, no screen is updated, thereby no frame data is transmitted. In a period T3, the frame data 421, 422, 423, . . . is transmitted to the mobile terminal device 100.

Moreover, the server device 200 generates still image data 430 for the right edge of the scroll area 310 (an area where the scroll is completed) and transmits the generated data to the mobile terminal device 100.

As described above, generating difference information by a moving image format when update frequency of the screen is high allows a screen to be displayed smoothly at the mobile terminal device 100.

Moreover, the server device 200 transmits still image data 430 in the end. Accordingly, the user does not feel any discomfort because image quality of the screen before and after the scroll is substantially the same.

Figure 21:
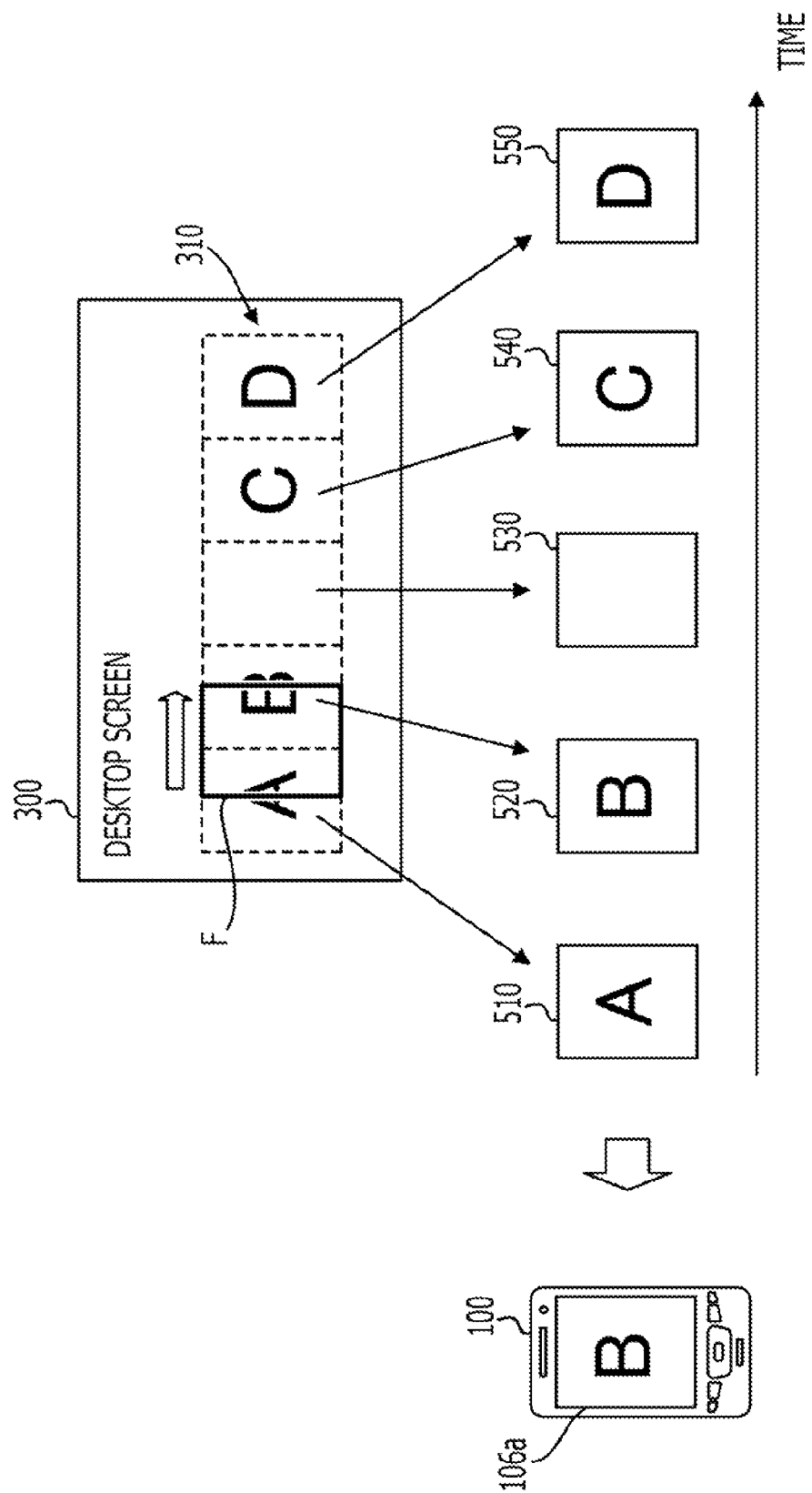
FIG. 21 illustrates a first comparison example of difference information transmission method.

FIG. 21 illustrates a first comparison example of difference information transmission method. FIG. 21 illustrates a case in which the server device 200 transmits difference information with a still image format (still image data). In this case, the server device 200 generates still image data 510, 520, 530, 540, and 550 and transmits the generated still image data to the mobile terminal device 100. When update frequency by the scroll is low, transmitting a screen being scrolled by the still image data does not much influence on an operation response of the mobile terminal device 100.

However, when update frequency by the scroll is high, the number of still image data to be transmitted to the mobile terminal device 100 increases as the update frequency increases. Meanwhile, a data size of one piece of still image data is substantially the same. Thus, the mobile terminal device 100 receives and displays a large amount of still image data in a short time period. As a result, processing load of the mobile terminal device 100 greatly increases, and this may deteriorate an operation response.

Accordingly, the server device 200 generates difference information with the moving image format when the update frequency of the screen is high as illustrated in FIG. 20. As a result, the efficient compression method employed by the moving image format may be used for each frame. Hence, the processing cost caused at the mobile terminal device 100 may be reduced. Accordingly, an operation response in the thin client system may be improved.

Hereinafter, a third embodiment will be described by referring to the accompanying drawings. Differences from the above-described second embodiment are mainly described and similar items are not described.

According to the second embodiment, operation inputs by the touch panel and the keypad are mainly described. According to the third embodiment, an operation input by an acceleration sensor will be described. A user may perform a scroll operation by shaking a mobile terminal device.

An overall configuration of a thin client system according to the third embodiment is substantially the same as that of the second embodiment described by referring to FIG. 2, and therefore will not be described. Hardware and functional configurations of a mobile terminal device and a server device according to the third embodiment is substantially the same as those of the mobile terminal device 100 and the server device 200, and therefore will not be described.

Hereinafter, the same reference numerals that are indicated in each of the configurations of the mobile terminal device 100 and the server device 200 are used substantially for those of the mobile terminal device and the server device according to the third embodiment for convenience of the descriptions.

Note that the third embodiment differs from the second embodiment in that an operation information acquisition unit 110 acquires operation information based on an operation input to an acceleration sensor 107c in the mobile terminal device 100. The operation information acquisition unit 110 includes information of acceleration detected by the acceleration sensor 107c in the operation information.

Figure 22:
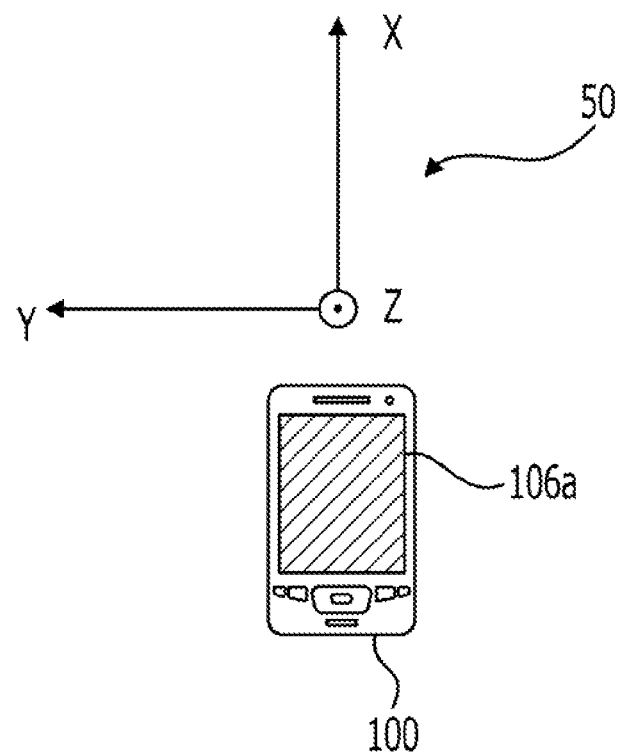
FIG. 22 illustrates a coordinate system of a mobile terminal device.

Moreover, the third embodiment differs from the second embodiment in that characteristics of each of the mobile terminal device 100 and the mobile terminal device 100a are taken account of when a vector value calculation unit 242 calculates a vector value from the operation information. FIG. 22 illustrates a coordinate system of the mobile terminal device. The coordinate system 50 is a coordinate system that is fixed to the mobile terminal device 100. The coordinate system 50 is a three-dimensional coordinate system that is made up of an x-axis, y-axis, and z-axis. Facing a display 106a of the mobile terminal device 100, an up direction is the x-axis, a left direction is the y-axis, and a direction from the inner part to the front part of the screen is the z-axis.

When the acceleration sensor 107c detects a move operation of the mobile terminal device 100 by the user, the acceleration sensor 107c measures acceleration of each axis direction of the coordinate system 50. The operation information acquisition unit 110 acquires the acceleration measured by the acceleration sensor 107c, includes the acceleration in the operation information, and outputs the operation information to the operation information notification unit 120.

The operation information acquisition unit 110 includes identification information assigned to each mobile terminal device in the operation information. Moreover, the operation information acquisition unit 110 includes identification information of a user who operates each mobile terminal device in the operation information.

Figure 23A:
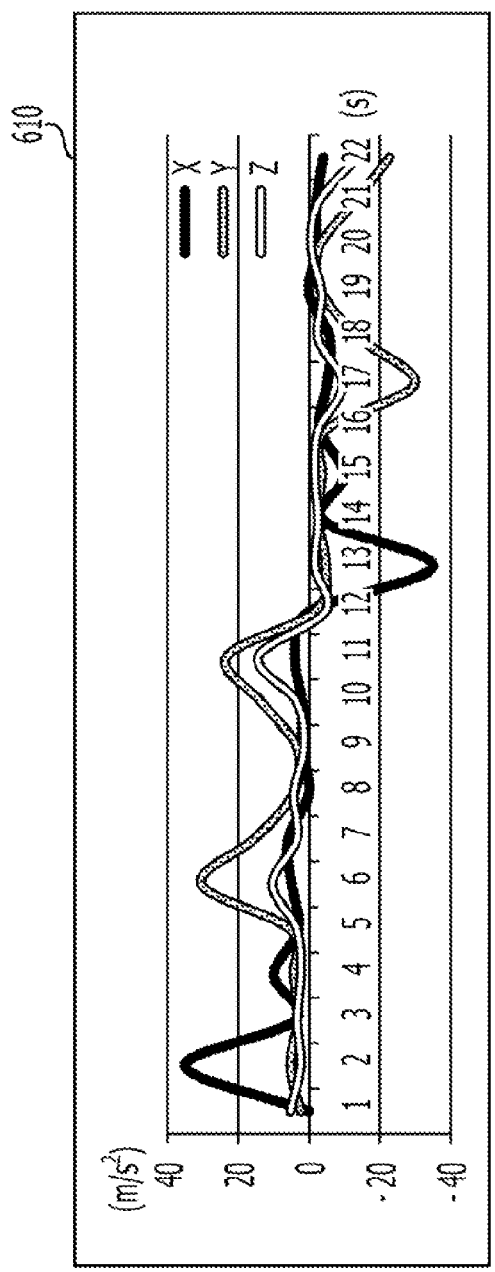
FIGS. 23A and 23B illustrate acceleration data.
Figure 23B:
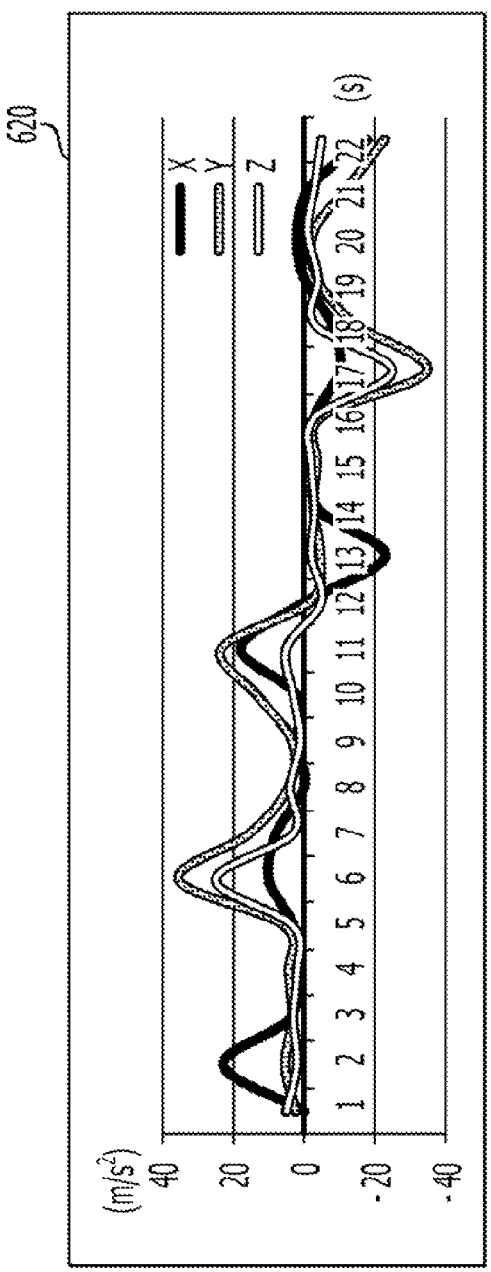

FIGS. 23A and 23B illustrate acceleration data. FIG. 23A illustrates a graph 610 of acceleration data measured by the mobile terminal device 100. FIG. 23B illustrates a graph 620 of acceleration data measured by the mobile terminal device 100a. The horizontal axis indicates time (second), while the vertical axis indicates acceleration (meter per second) in both of the graphs 610 and 620.

Characteristics of the acceleration sensors provided in the mobile terminal device 100 and the mobile terminal device 100a differ. Thus, even if the same user performs an input operation, measured acceleration is different. The graphs 610 and 620 illustrate a case in which substantially the same operation input is performed for the mobile terminal device 100 and the mobile terminal device 100a. The graphs 610 and 620 illustrate that measured acceleration data differs depending on the mobile terminal devices. Furthermore, when different users operate the same mobile terminal, measured acceleration differs even if substantially the same operation is performed because each user has his or her operation habit.

Accordingly, the server device 200 acquires vector information by taking account of characteristics of an acceleration sensor for each mobile terminal device and an operation trend of a user. FIG. 24 illustrates a data structure example of a sensor characteristics correction coefficient table. A sensor characteristics correction coefficient table 252 defines a correction coefficient to correct characteristics of acceleration sensors provided in the mobile terminal device 100 and the mobile terminal device 100a. The sensor characteristics correction coefficient table 252 is stored in a control information storage unit 250.

The sensor characteristics correction coefficient table 252 includes items of a terminal identifier (ID) and correction coefficients. Pieces of information for each item arranged horizontally indicate a set of correction coefficients for one mobile terminal device.

Identification information of a mobile terminal device is set in the item of the terminal ID. Coefficients to correct parameters of respective axes are included in the item of the correction coefficients. Parameters to be corrected are defined in a vector value conversion table, which will be described later. The item of the correction coefficient further includes items of X, Y, and Z. A correction coefficient of a parameter of an X-axis direction is set in the item of X. A correction coefficient of a parameter of a Y-axis direction is set in the item of Y, while a correction coefficient of a parameter of a Z-axis direction is set in the item of Z.

For example, information such as the terminal ID, "M00001," the correction coefficient of X-axis, "1.5," the correction coefficient of Y-axis, "1.0," and the correction coefficient of Z-axis, "1.2" are set in the sensor characteristics correction coefficient table 252.

The above-described information indicates that when acceleration data is obtained from the mobile terminal device 100 corresponding to the terminal ID "M00001," the parameter of the X-axis is corrected by multiplying by 1.5, the parameter of the Y-axis is corrected by multiplying by 1.0, and the parameter of the Z-axis is corrected by multiplying by 1.2.

FIG. 25 is a data structure example of a vector value conversion table. A vector value conversion table 253 defines a determination condition of an operation direction according to an operation trend for each user and a calculation formula to convert acceleration into a vector value. The vector value conversion table 253 is stored in the control information storage unit 250.

The vector value conversion table 253 includes items of a user ID, an acceleration determination condition, a scroll direction, and a vector value calculation formula. Pieces of information for the items arranged horizontally are associated with each other and indicate a correspondence relationship, for example, of a scroll direction and a scroll amount.

Identification information of a user who operates the mobile terminal device is set in the user ID. A condition to determine a scroll direction is set in the acceleration determination condition. A scroll direction that is applied if the determination condition set in the acceleration determination condition is satisfied is set in the scroll direction. A calculation formula of a vector value for the scroll direction is set in the vector value calculation formula.

For example, information such as the user ID, "U00001," the acceleration determination condition, "X'>20," the scroll direction, "up," and the vector value calculation formula, "X'×100" are set in the vector value conversion table 253.

The above-described information indicates that when acceleration of the x-axis direction is 20 meters per second, the scroll direction (vector direction of a scroll operation) is determined to be up (a positive direction of an x-axis). A vector value of the scroll direction is obtained by multiplying acceleration of the x-axis direction by 100. Here, a unit of the vector value is, for example, pixel per second.

Note that "X", "Y", and "Z" in FIG. 25 indicate acceleration of the x-axis direction, y-axis direction, and z-axis direction respectively. A plurality of conditions may be defined for the acceleration determination condition in the vector value conversion table 253. For example, information such as the user ID, "U00001," the acceleration determination condition, "Y'/Z'<6, Y'>0," the scroll direction "left," and the vector value calculation formula, "Y'×70" are set in the vector value conversion table 253.

The above-described information indicates that the scroll direction is determined to be the left direction (a positive direction of the Y-axis) if a result of dividing acceleration of the Y-axis by acceleration of the Z-axis is greater than 6 and acceleration of the Y-axis is greater than 0. The vector value of the scroll direction is obtained by multiplying acceleration of the Y-axis direction by 70.

The vector value calculation unit 242 corrects each parameter of the vector value conversion table 253 when the vector value calculation unit 242 obtains correction coefficients from the sensor characteristics correction coefficient table 252. For example, when correction coefficients of a terminal ID, "M00001" for X, "1.5," Y "1.0," and Z, "1.2" are obtained from the sensor characteristics correction coefficient table 252, a method to correct each parameter corresponding to the user ID, "U00001" is as follows.

(1) An acceleration determination condition, "X'>20" is assumed to be "X'>20×1.5=30"
(2) An acceleration determination condition, "Y'/Z'>6" is assumed to be "Y'/Z'>6×1.0/1.2=5"
(3) An acceleration determination condition, "Y'/Z'<3" is assumed to be "Y'/Z'<3×1.0/1.2=2.5"
(4) Multiply "100" in a vector value calculation formula, "X'×100" by 1.5 to obtain "X'×150"
(5) Multiply "100" in a vector value calculation formula, "Y'×30+Z'×100" by 1.2 to obtain "Y'×30+Z'×120"

A vector value that takes account of influences such as an operation habit of a user and a position where the acceleration sensor is installed may be obtained by calculating the vector value using the corrected parameter.

Processing procedures of the thin client system configured as above will be described. Here, an entire scroll update processing of the mobile terminal device is substantially the same as that of the second embodiment illustrated in FIG. 10 and will not be described. According to the third embodiment, processing procedures of operation S1 (operation information notification processing) and operation S2 (vector value calculation processing) included in the screen update processing differ. Accordingly, hereinafter, the processing procedures will be described in detail.

Figure 26:
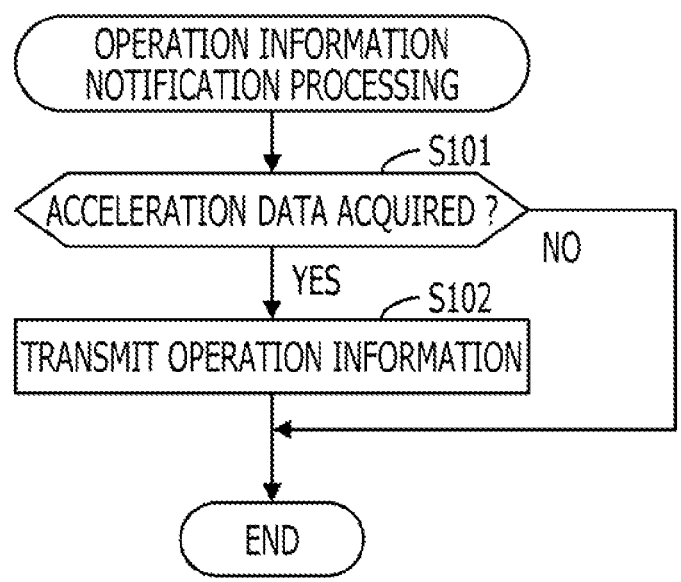
FIG. 26 is a flow chart illustrating operation information notification processing according to a third embodiment.

FIG. 26 is a flow chart illustrating operation information notification processing according to the third embodiment. Hereinafter, the processing illustrated in FIG. 26 will be described along with operation numbers.

(Operation S101) The operation information acquisition unit 110 determines whether there is any operation input (scroll operation) by moving the mobile terminal device 100. If there is an operation input, acceleration of respective axis directions measured by the acceleration sensor 107c is obtained and processing proceeds to operation S102. If there is no operation input, the processing is completed.

(Operation S102) The operation information acquisition unit 110 acquires operation information that includes acceleration information according to an operation input. The operation information acquisition unit 110 acquires a terminal ID of the mobile terminal device 100 (for example, M00001) and a user ID of a user who operates the mobile terminal device 100 (for example, "U00001") and includes the acquired information in the operation information. The operation information acquisition unit 110 outputs the operation information to the operation information notification unit 120. The operation information notification unit 120 transmits the operation information to the server device 200 through the communication unit 130.

Figure 27:
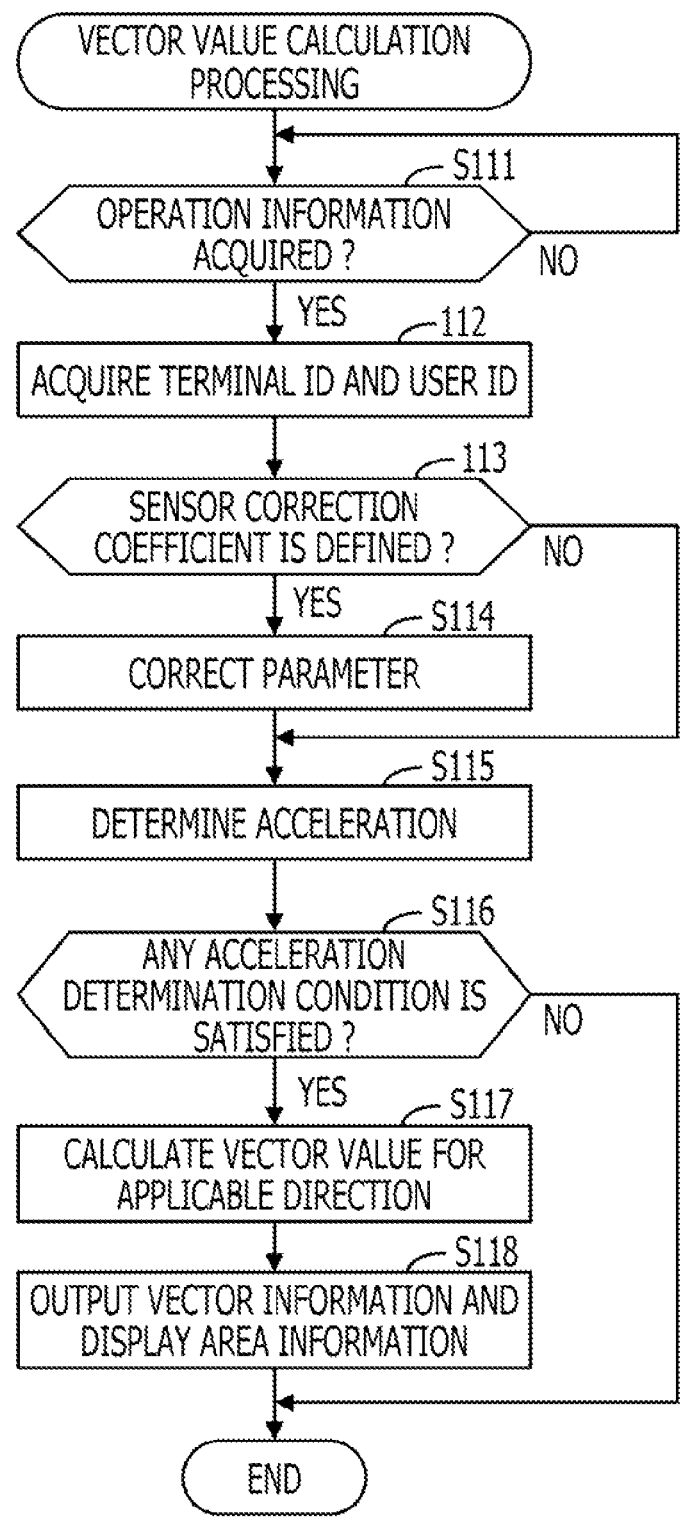
FIG. 27 is a flow chart illustrating vector value calculation processing according to the third embodiment.

The operation information acquisition unit 110 acquires operation information that includes information of the acceleration according to an operation input. The operation information notification unit 120 notifies the server device 200 of the operation information. FIG. 27 is a flow chart illustrating vector value calculation processing according to the third embodiment. Hereinafter, the processing illustrated in FIG. 27 will be described along with operation numbers.

(Operation S111) The operation information acquisition unit 241 determines whether the operation information acquisition unit 241 receives the operation information from the mobile terminal device 100. If the operation information acquisition unit 241 receives the operation information, the operation information acquisition unit 241 outputs the operation information to the vector value calculation unit 242 and proceeds to operation S112. If the operation information acquisition unit 241 does not receive the operation information, the operation information acquisition unit 241 waits until receiving the operation information (processing proceeds to operation S111).

(Operation S112) The vector value calculation unit 242 acquires a terminal ID and a user ID from the operation information. For example, the vector value calculation unit 242 acquires a terminal ID "M00001" and a user ID "U00001."

(Operation S113) The vector value calculation unit 242 refers to the sensor characteristics correction coefficient table 252 and determines whether a correction coefficient for the terminal ID is defined. If the correction coefficient for the terminal ID is defined, the processing proceeds to operation S114. If the correction coefficient for the terminal ID is not defined, the processing proceeds to operation S115.

(Operation S114) The vector value calculation unit 242 refers to the vector value conversion table 253 stored in the control information storage unit 250 based on the user ID. The vector value calculation unit 242 corrects each parameter corresponding to the user ID by the correction coefficient. The specific example of correction is as described by referring to FIG. 25.

(Operation S115) The vector value calculation unit 242 refers to the acceleration determination condition in the vector value conversion table 253 based on the user ID and determines the acceleration. If a parameter included in the acceleration determination condition is corrected at operation S114, determination is made by the corrected acceleration determination condition.

(Operation S116) The vector value calculation unit 242 determines whether an acceleration determination condition for the record is satisfied by the corrected acceleration acquired at operation S113. If one of the acceleration determination conditions is satisfied, processing proceeds to operation S116. If both of the acceleration determination conditions are not satisfied, the processing is completed. Note that if both of the acceleration determination conditions are not satisfied, it is determined that the operation information does not indicate a scroll operation. In this case, the screen update processing of the mobile terminal device is completed without performing processing thereafter.

(Operation S117) The vector value calculation unit 242 calculates a vector value for the scroll direction identified by the acceleration determination condition. For example, a case is considered in which acceleration (X',Y',Z')=(35,−5.0,3.0) is obtained for the terminal ID "M00001" and the user ID "U00001." In this case, a vector value below may be calculated by using the vector value conversion table 253 (after correcting parameters)

(1) Expression, X'=35>30 is satisfied.
Thus, a vector value, X'×150=35×150=5250 pixel/second is obtained for a scroll of an upward direction.
(2) Both expressions, Y'/Z'=−1.67<2.5 and Z'=3.0>0 are satisfied. Thus, a vector value, Y'×30+Z'×120=−5.0×30+3.0×120=−150+360=210 pixel/second is obtained for a scroll of a right direction.

The vector value calculation unit 242 acquires a vector value typically for the significant direction of the above-described (1) and (2). In this case, the vector value of the upward direction is greater than the vector value of the right direction, thus the vector value of 5250 pixels/second is obtained for the upward direction (corresponds to a negative direction of y-axis in the display screen of the display 106a) and the direction together with the vector value make up the vector information. Note that vectors obtained by (1) and (2) may be further synthesized to obtain a vector of an upper right direction and may be included in the vector information.

(Operation S118) The vector value calculation unit 242 outputs the acquired vector information and the display area information to the scroll behavior determination unit 243. The display area information is included in the operation information as described above.

As described above, the vector value calculation unit 242 acquires vector information corresponding to a scroll operation based on the operation information. The vector value calculation unit 242 outputs the vector information to the scroll behavior determination unit 243.

Hereinafter, the thin client system according to the third embodiment executes processing of operations S3 to S8 included in the entire screen update processing according to the second embodiment. The processing procedures are substantially the same as the above-described procedures, and will not be described.

Accordingly, degradation of an operation response may be suppressed even when a screen is scrolled according to acceleration measured by movement of the mobile terminal devices 100 and 100a. In other words, as in the second embodiment, the server device 200 generates difference information with a moving image format and transmits the generated difference information to the mobile terminal devices 100 and 100a when an update frequency of the screen by scrolls is high. As a result, processing load of the mobile terminal devices 100 and 100a may be reduced compared with when an image is transmitted with a still image format.

The server device 200 obtains vector information by a method according to characteristics of the acceleration sensor of each mobile terminal device and operational trends of the user. Accordingly, a comfortable operating environment may be provided according to mobile terminal devices and users.

The sensor characteristics correction coefficient table 252 and the vector value conversion table 253 may be changed by an administrator of the server device 200 or users of the mobile terminal devices 100 and 100a.

Moreover, according to the second and the third embodiments, cases in which a scroll operation is accepted by the touch panel 107a, the keypad 107b, and the acceleration sensor 107c are described. However, the embodiments are not limited to the cases but the above-described processing method may be applied. For example, an optical sensor, a geomagnetic sensor, and a temperature sensor may be provided instead of (or together with) the touch panel 107a, the keypad 107b, and the acceleration sensor 107c to accept scroll operations by the sensor. Furthermore, the above-described processing method may be applied to a case when a scroll operation by audio through the microphone 108a is accepted.

The mobile terminal devices 100 and 100a may be, for example, a mobile phone, a Personal Digital Assistant (PDA), a laptop computer, a mobile game machine, and a portable music player. The OS executed by the server device 200 may be various types of OSs without depending on a specific architecture.

Image transmission methods, image transmission devices, and image transmission programs are described based on the illustrated embodiments. However, the embodiments are not limited to these but configuration of each component may be replaced with any configuration that provides similar functions. Furthermore, other configurations or operations may be added. Moreover, two or more configurations (characteristics) among the above-described embodiments may be combined.

All examples and conditional language recited herein are intended for pedagogical purposes to aid the reader in understanding the invention and the concepts contributed by the inventors to furthering the art, and are to be construed as being without limitation to such specifically recited examples and conditions. Although the embodiments of the present invention have been described in detail, it should be understood that the various changes, substitutions, and alterations could be made hereto without departing from the spirit and scope of the invention.

What is claimed is:

1. An image transmission method comprising:
   acquiring operation information to scroll an image displayed on a screen of a device;
   determining a scroll direction and a scroll speed of the image based on the operation information;
   calculating an update frequency of a plurality of images;
   when the update frequency is greater than a threshold frequency, determining a format of an image to be transmitted as a moving image format, generating a moving image from the plurality of images that are sequentially displayed on the screen, and transmitting the moving image to the device; and
   when the update frequency is less than the threshold frequency, determining the format of the image to be transmitted as a still image format, and transmitting the plurality of images to the device as the still image format.

2. The method according to claim 1,
   wherein a display time interval is determined based on the scroll direction, the scroll speed, and a size of an image display area of the device.

3. The method according to claim 2, further comprising:
   increasing the display time interval when a difference of positions of two images that are sequentially displayed at the display time interval based on the scroll direction and the scroll speed is at least a value obtained by dividing the size of the image display area by a specified value.

4. The method according to claim 2, further comprising:
   decreasing the display time interval when a difference of positions of two images that are sequentially displayed at the display time interval based on the scroll direction and the scroll speed is at most a value obtained by dividing the size of the image display area by a specified value.

5. The method according to claim 1, further comprising:
   determining a quality of an image to be displayed on the screen of the device based on the scroll direction, the scroll speed, and a size of an image display area of the device.

6. The method according to claim 5, further comprising:
   degrading image quality when a difference of positions of two images that are sequentially displayed at the display time interval based on the scroll direction and the scroll speed is at least a value obtained by dividing the size of the image display area by a specified value.

7. The method according to claim 5, further comprising:
   enhancing image quality when a difference of positions of two images that are sequentially displayed at the display time interval based on the scroll direction and the scroll speed is at most a value obtained by dividing the size of the image display area by a specified value.

8. The method according to claim 1, further comprising:
   converting an acceleration direction into the scroll direction and converting a magnitude of the acceleration into the scroll speed;
   wherein the operation information includes information that indicates acceleration of the device.

9. The method according to claim 8,
wherein the converting the acceleration into the scroll direction and the scroll speed refers to a storage device that stores a conversion rule to convert the acceleration into the scroll direction and the scroll speed in association with identification information of a user of the device when the operation information is received.

10. An image transmission device comprising:
a processor, the processor configured to:
- determine a scroll direction and a scroll speed of an image based on operation information when the processor acquires the operation information to scroll the image displayed on a screen of a device,
- calculate an update frequency of a plurality of images;
- when the update frequency is greater than a threshold frequency, determine a format of an image to be transmitted as a moving image format,
- generate a moving image from the plurality of images that are sequentially displayed on the screen, and transmit the moving image to the device;
- when the update frequency is less than the threshold frequency, determine the format of the image to be transmitted as a still image format, and transmit the plurality of images to the device as the still image format, and a memory configured to store moving image information.

11. The device according to claim 10,
wherein the processor is further configured to:
determine a display time interval based on the scroll direction, the scroll speed, and a size of an image display area of the device.

12. The device according to claim 11,
wherein the processor is further configured to:
increase the display time interval when a difference of positions of two images that are sequentially displayed at the display time interval based on the scroll direction and the scroll speed is at least a value obtained by dividing the size of the image display area by a specified value.

13. The device according to claim 11,
wherein the processor is further configured to:
decrease the display time interval when a difference of positions of two images that are sequentially displayed at the display time interval based on the scroll direction and the scroll speed is at most a value obtained by dividing the size of the image display area by a specified value.

14. The device according to claim 10,
wherein the processor is further configured to:
determine a quality of an image to be displayed on the screen of the device based on the scroll direction, the scroll speed, and a size of an image display area of the device.

15. The device according to claim 14,
wherein the processor is further configured to:
degrade image quality when a difference of positions of two images that are sequentially displayed at the display time interval based on the scroll direction and the scroll speed is at least a value obtained by dividing the size of the image display area by a specified value.

16. The device according to claim 14,
wherein the processor is further configured to:
enhance image quality when a difference of positions of two images that are sequentially displayed at the display time interval based on the scroll direction and the scroll speed is at most a value obtained by dividing the size of the image display area by a specified value.

17. The device according to claim 10,
wherein the operation information includes information that indicates acceleration of the device; and
wherein the processor is further configured to:
convert an acceleration direction into the scroll direction and convert a magnitude of the acceleration into the scroll speed.

18. A non-transitory computer-readable medium storing an image transmission program causing a computer included in an image transmission device, to execute a process comprising:
- acquiring operation information to scroll an image displayed on a screen of a device;
- determining a scroll direction and a scroll speed of the image based on the operation information;
- calculating an update frequency of a plurality of images;
- when the update frequency is greater than a threshold frequency, determining a format of the image to be transmitted as a moving image format, generating a moving image from the plurality of images that are sequentially displayed on the screen, and transmitting the moving image to the device; and
- when the update frequency is less than the threshold frequency, determining the format of the image to be transmitted as a still image format, and transmitting the plurality of images to the device as the still image format.

* * * * *